(12) United States Patent
Deppermann et al.

(10) Patent No.: US 9,448,968 B2
(45) Date of Patent: Sep. 20, 2016

(54) AUTOMATED SMALL OBJECT SORTING SYSTEMS AND METHODS

(75) Inventors: Kevin L. Deppermann, St. Charles, MO (US); David W. Finley, Crestwood, MO (US); Elias J. Yannakakis, Chesterfield, MO (US)

(73) Assignee: Monsanto Technology LLC, St. Louis, MO (US)

( * ) Notice: Subject to any disclaimer, the term of this patent is extended or adjusted under 35 U.S.C. 154(b) by 872 days.

(21) Appl. No.: 13/637,505

(22) PCT Filed: Feb. 23, 2011

(86) PCT No.: PCT/US2011/025847
§ 371 (c)(1),
(2), (4) Date: Dec. 7, 2012

(87) PCT Pub. No.: WO2011/119281
PCT Pub. Date: Sep. 29, 2011

(65) Prior Publication Data
US 2013/0079917 A1  Mar. 28, 2013

Related U.S. Application Data

(60) Provisional application No. 61/317,967, filed on Mar. 26, 2010.

(51) Int. Cl.
| G06F 7/00 | (2006.01) |
| G06F 17/00 | (2006.01) |
| B07C 5/342 | (2006.01) |

(52) U.S. Cl.
CPC ............. *G06F 17/00* (2013.01); *B07C 5/3425* (2013.01); *B07C 2501/009* (2013.01)

(58) Field of Classification Search
CPC .................................................... B07C 5/3425
USPC .................................. 209/232; 700/223, 218
See application file for complete search history.

(56) References Cited

U.S. PATENT DOCUMENTS

| 2005/0040082 A1 | 2/2005 | Ogawa et al. |
| 2008/0000815 A1 | 1/2008 | Deppermann |
| 2008/0310674 A1 | 12/2008 | Modiano et al. |
| 2010/0187785 A1* | 7/2010 | Knappe ............... A61G 12/001 280/47.34 |
| 2011/0186587 A1* | 8/2011 | Edwards ............... B65D 83/04 221/1 |

OTHER PUBLICATIONS

International Search Report from corresponding PCT/US2011/025847 mailed May 9, 2011.

* cited by examiner

*Primary Examiner* — Stefanos Karmis
*Assistant Examiner* — Michael E Butler
(74) *Attorney, Agent, or Firm* — Polster Lieder

(57) ABSTRACT

In various embodiments, a small object sorting system includes an object tray cart docking station configured to dock an object tray cart here within. The system additionally includes an automated tray removal and positioning subsystem configured to remove an object tray from the object tray cart, selectively position the tray such that selected small objects can be extracted therefrom, and replace the object tray into the object tray cart. Furthermore, the system includes an automated collection assembly positioning subsystem configured to selectively position a collection assembly such that the selected extracted small objects can be deposited into selected object receptacles, and an automated object extraction subsystem configured to extract the selected small objects and deposit each extracted small object into the selected object receptacles.

19 Claims, 17 Drawing Sheets

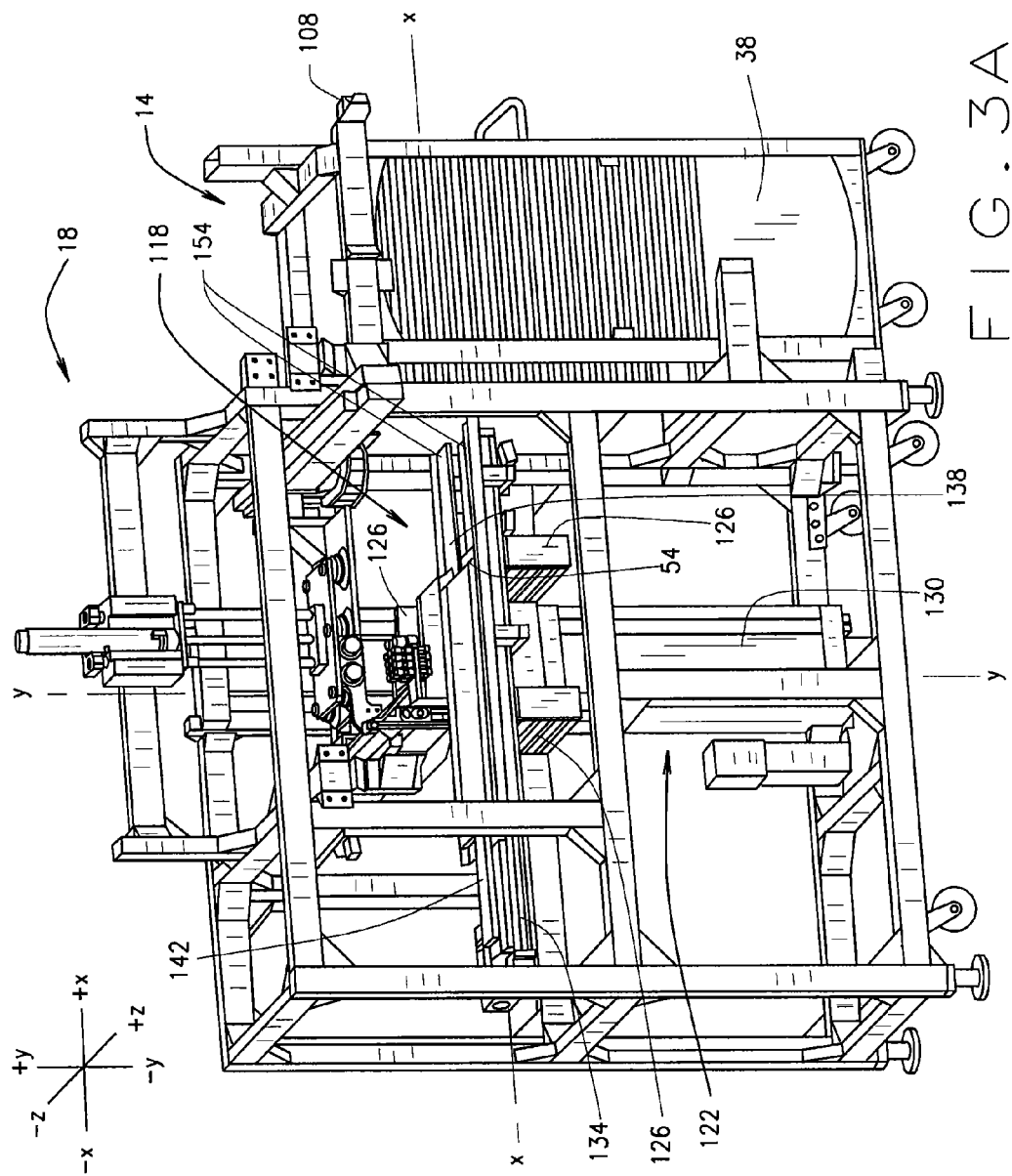

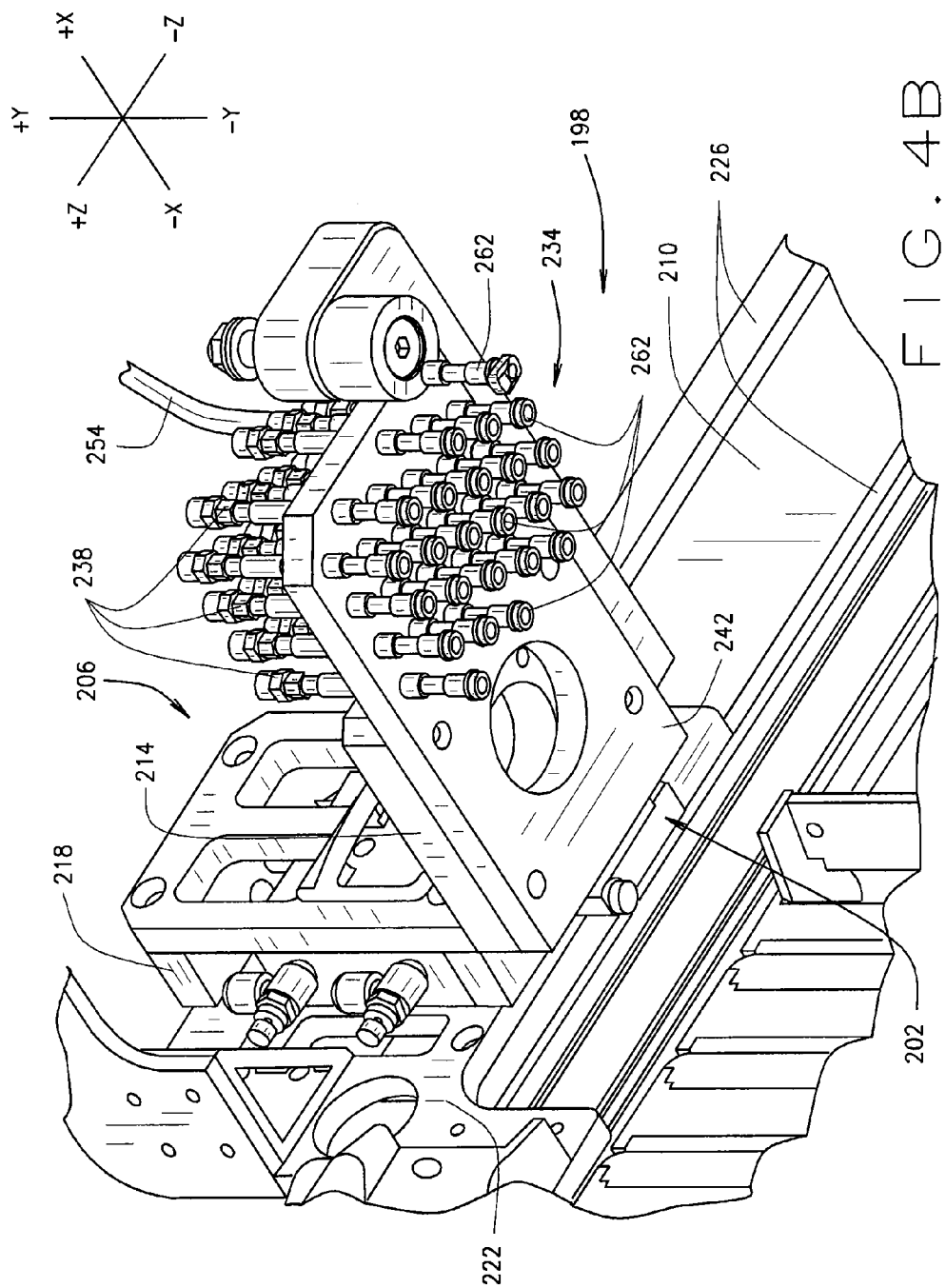

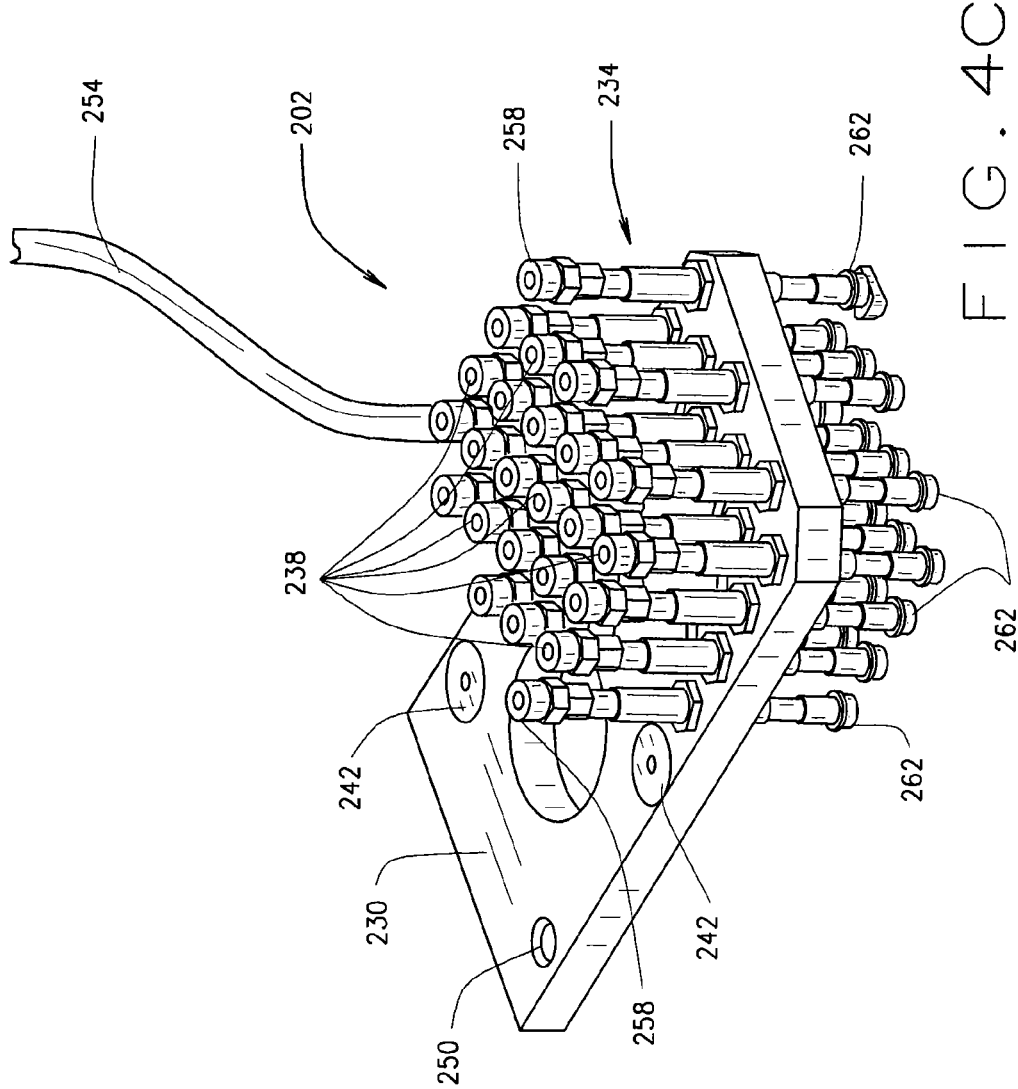

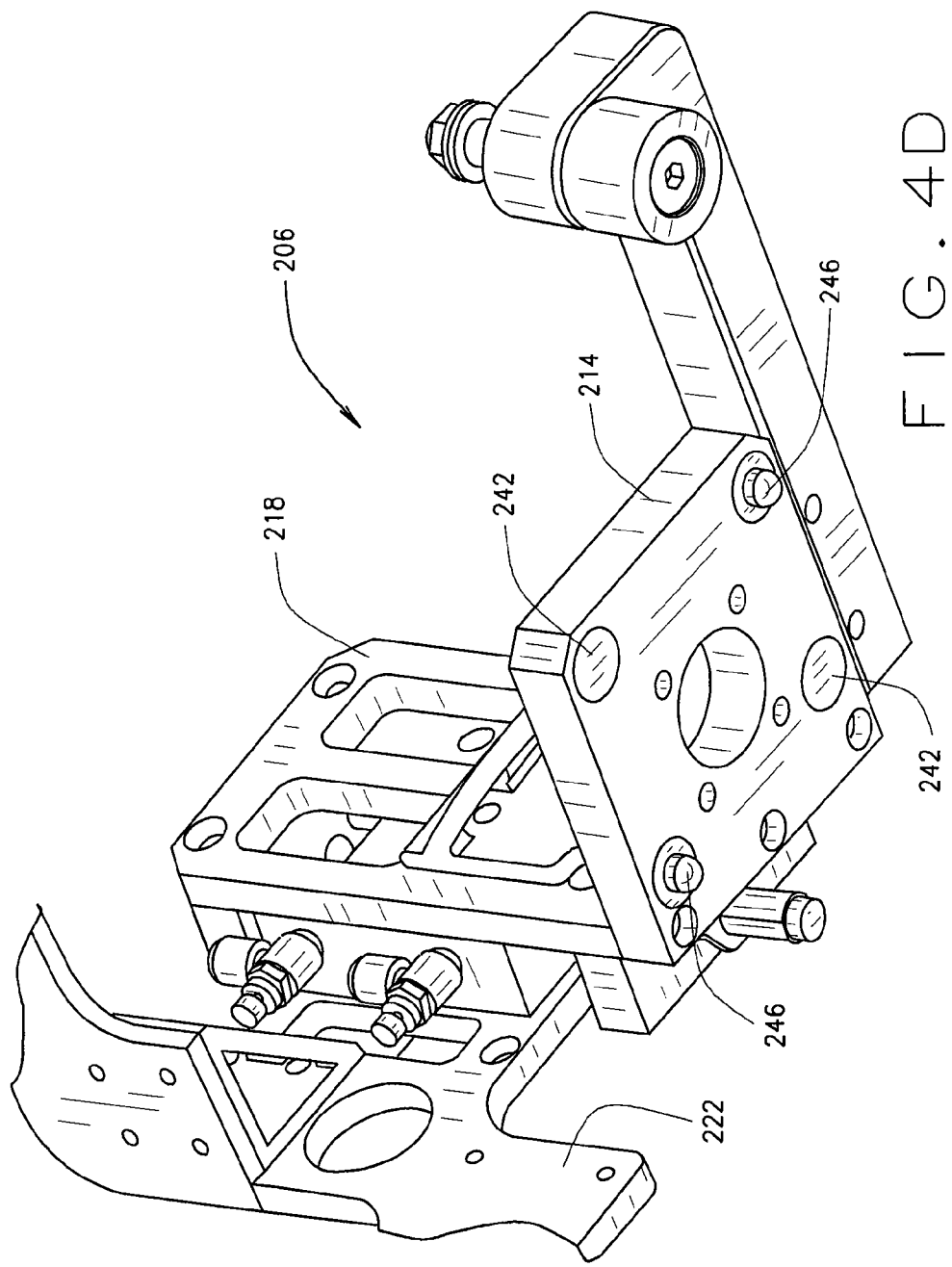

AUTOMATED SMALL OBJECT SORTING SYSTEMS AND METHODS

CROSS-REFERENCE TO RELATED APPLICATIONS

This application is a National Stage of International Application No. PCT/US2011/025847, filed Feb. 23, 2011, which claims priority to U.S. Provisional Application No. 61/317,967 filed on Mar. 26, 2010. The disclosures of the above applications are incorporated herein by reference in its entirety.

Additionally, the present application is related in general subject matter to U.S. application Ser. No. 11/769,318, filed Jun. 27, 2007, and titled "Small Object Sorting System and Method", which is assigned to the assignee of the present application.

FIELD

The present disclosure relates generally to a system and method for sorting small objects, such as seeds, pharmaceutical tablets or capsules, and any other agricultural, manufactured or produced small objects.

BACKGROUND

The statements in this section merely provide background information related to the present disclosure and may not constitute prior art.

The sorting of small agricultural, manufactured and/or produced objects such as seeds, pharmaceutical tablets or capsules, small electrical components, ball bearings, small food products, etc. can be cumbersome, painstakingly tedious, and wrought with human error.

For example, in seed breeding, large numbers of seeds are sampled and analyzed to determine whether the seeds possess a particular genotype or traits of interest. Generally, seeds are sampled by removing a small portion of each seed, while leaving the remaining seed viable for planting. The removed portions, or chips, and the corresponding 'donor' seeds are then cataloged to track the seeds and the respective corresponding chips. Each chip is then analyzed to identify various attributes of the respective chip and donor seed, such as DNA characteristics and/or traits.

After the seeds are sampled and the chips have been analyzed, the seeds are individually sorted according to attributes of each respective seed. Typically, the sorting process is painstakingly performed by hand, which is extremely time consuming and subject to human error.

SUMMARY

The present disclosure provides automated systems and methods for sorting small objects, such as seeds, pharmaceutical tablets or capsules, and any other agricultural, manufactured or produced small objects.

In various embodiments, an exemplary small object sorting system includes an object tray cart docking station that is structured and operable to receive and engage an object tray cart to dock the object tray cart within the object tray cart docking station. The system additionally includes an automated tray removal and positioning subsystem that is structured and operable to remove an object tray from the object tray cart, wherein the object tray including a plurality of wells and a plurality of small objects stored within the wells. The automated tray removal and positioning subsystem is further structured and operable to selectively position the removed tray such that selected ones of the small objects can be extracted from the removed object tray, and replace the removed object tray into the object tray cart after the selected small objects have been extracted. Furthermore, the system includes an automated collection assembly positioning subsystem that is structured and operable to selectively position a collection assembly such that the selected one or more small objects extracted from the removed object tray can be deposited into selected one or more of a plurality of object receptacles of the collection assembly. The system still further includes an automated object extraction subsystem that is structured and operable to extract the selected one or more small objects from the object tray and deposit each extracted small object into the selected one or more object receptacles.

In various other embodiments, an exemplary small object sorting method includes docking an object tray cart within an object tray cart docking station of an automated small object sorting system and removing an object tray from the object tray cart utilizing an automated tray removal and positioning subsystem of the automated small object sorting system, wherein the object tray includes a plurality of wells and a plurality of small objects stored within the wells. The method additionally includes selectively positioning the removed tray, utilizing the automated tray removal and positioning subsystem, such that selected ones of the small objects can be extracted from the removed object tray. Furthermore, the method includes selectively positioning a collection assembly of the automated small object sorting system, utilizing an automated collection assembly positioning subsystem of the automated small object sorting system, such that the selected one or more small objects extracted from the removed object tray can be deposited into a selected one or more of a plurality of object receptacles of the collection assembly. The method still further includes extracting the selected one or more small objects from the object tray and depositing each extracted small object into the selected one or more object receptacles utilizing an automated object extraction subsystem of the automated small object sorting system. Further yet, the method includes replacing the removed object tray into the object tray cart after the selected small objects have been extracted utilizing the automated tray removal and positioning subsystem.

In yet other embodiments, an exemplary seed sorting system includes a seed tray cart docking station that is structured and operable to receive and engage an seed tray cart to dock the seed tray cart within the seed tray cart docking station. The system additionally includes an automated tray removal and positioning subsystem that is structured and operable to remove an seed tray from the seed tray cart, wherein the seed tray including a plurality of wells and a plurality of seeds stored within the wells. The automated tray removal and positioning subsystem is further structured and operable to selectively position the removed tray such that selected ones of the seeds can be extracted from the removed seed tray, and replace the removed seed tray into the seed tray cart after the selected seeds have been extracted. Furthermore, the system includes an automated collection assembly positioning subsystem that is structured and operable to selectively position a collection assembly such that the selected one or more seeds extracted from the removed seed tray can be deposited into selected one or more of a plurality of seed receptacles of the collection assembly. The system still further includes an automated seed extraction subsystem that is structured and operable to extract the selected one or more seeds from the seed tray and deposit each extracted seed into the selected one or more seed receptacles. The system further yet includes a seed extraction verification assembly that is structured and operable to verify that the seed extraction subsystem extracted each of the selected seeds from the seed tray.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 3A is an isometric view of a tray removal and positioning subsystem of the small object sorting shown in FIGS. 1A and 1B, in accordance with various embodiments of the present disclosure.

FIG. 4B is an isometric view of an object transfer subassembly of the small object extraction subsystem shown in FIG. 4A, in accordance with various embodiments of the present disclosure.

FIG. 4C is an isometric view of a nozzle head of the object transfer subassembly shown in FIG. 4B, in accordance with various embodiments of the present disclosure.

FIG. 4D is an isometric view of a nozzle head carriage of the object transfer subassembly shown in FIG. 4B, in accordance with various embodiments of the present disclosure.

Corresponding reference numerals indicate corresponding parts throughout the several views of drawings.

DETAILED DESCRIPTION

Figure 1A:
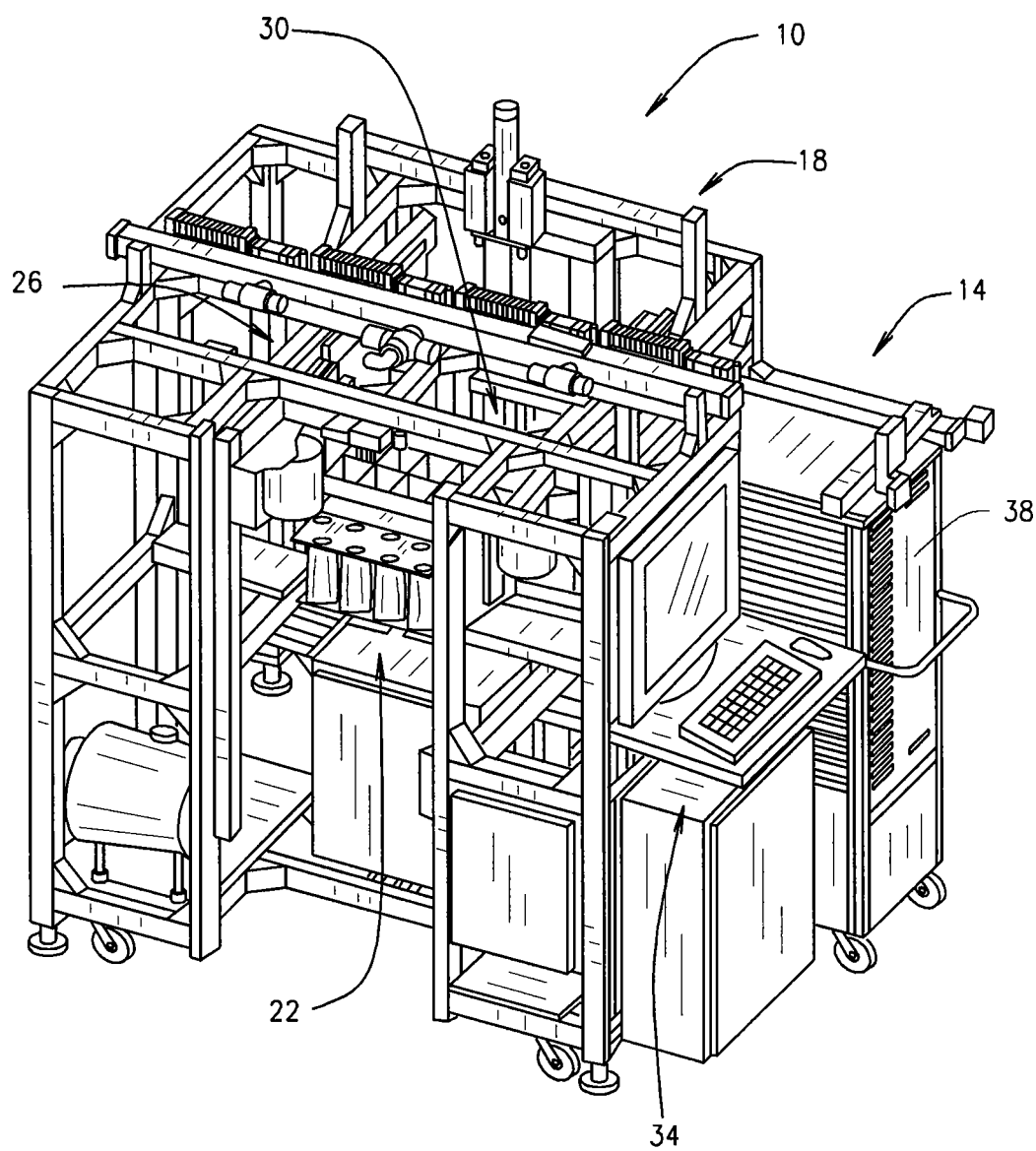
FIG. 1A is an isometric view of a front side of an automated small object sorting system, in accordance with various embodiments of the present disclosure.

The following description is merely exemplary in nature and is in no way intended to limit the present teachings, application, or uses. Throughout this specification, like reference numerals will be used to refer to like elements.

Figure 1B:
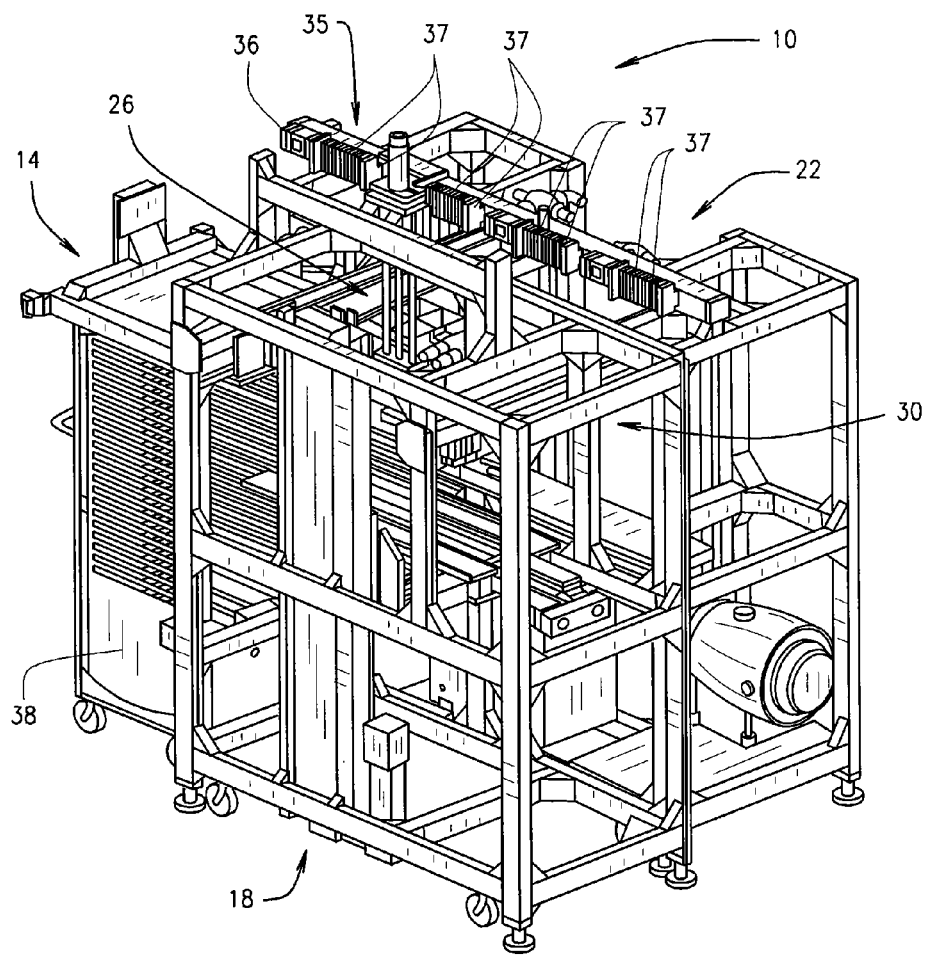
FIG. 1B is an isometric view of a back side of the automated small object sorting system shown in FIG. 1A, in accordance with various embodiments of the present disclosure.

Referring to FIGS. 1A and 1B, an automated small object sorting system 10 is provided for automatically, i.e., robotically, sorting small objects and depositing the sorted objects into selected receptacles based on particular attributes of each sorted object, e.g., characteristics and/or traits such as size, shape, color, composition, quality, weight, genetic traits, etc. The objects can be any small objects, items, parts or products that are desired to be sorted or separated based on particular attributes of each sorted object. For example, the sorting system 10 can be utilized to sort such small objects such as seeds and other agricultural products, pharmaceutical tablets or capsules, small electrical components, ball bearings, small food products, etc.

Generally, the sorting system 10 includes a small object tray docking station 14, an automated, or robotic, tray removal and positioning subsystem 18, an automated, or robotic, collection assembly positioning subsystem 22, an automated, or robotic, small object extraction subsystem 26, a small object extraction verification assembly 30, and a computer based central control system 34. The control system 34 is operable to control the automated and cooperative functions and operations of the small object tray docking station 14, the tray removal and positioning subsystem 18, the collection assembly positioning subsystem 22, the small object extraction subsystem 26, and the small object extraction verification assembly 30, i.e., the automated operation of the sorting system 10, as described below.

The sorting system 10 additionally includes a pneumatic supply assembly 35 that is connected to a vacuum source (not shown). In various embodiments, the pneumatic supply assembly 35 includes a vacuum bar 36 that is connected to the vacuum source and operates as a conduit for providing a vacuum to a plurality of regulators 37 coupled thereto. The regulators 37, as controlled by the central control system 34, regulate pneumatic command signals e.g., vacuum and/or expansion/positive pressure signals, sent to various systems, subsystems, assemblies, subassemblies, devices, apparatuses, and components of the sorting system 10. More particularly, the central control system 34 controls the operation of the regulators 37 to provide, monitor, condition and/or modulate positive pressure signals and/or vacuum signals utilized to operate the various systems, subsystems, assemblies, subassemblies, devices, apparatuses, and components of the sorting system 10, as described herein. It should be understood that sorting system 10 includes a plurality of various vacuum and/or pressure line, e.g., flexible tubing, that connect the regulators 37 to, and communicate the pneumatic command signals e.g., vacuum and/or expansion/positive pressure signals to, the various systems, subsystems, assemblies, subassemblies, devices, apparatuses, and components of the sorting system 10. However, for clarity, many of the vacuum and/or pressure lines are not illustrated of the various figures described herein.

Alternatively, the various systems, subsystems, assemblies, subassemblies, devices, apparatuses, and components of the sorting system 10 can be operated utilizing other energy sources such as electricity, hydraulics, etc.

Additionally, it should be understood that the sorting system 10, as shown and described herein, includes various stationary braces, beams, platforms, pedestals, stands, etc., to which the various components, devices, mechanisms, systems, subsystems, assemblies and subassemblies described herein are supported, coupled, connected and/or mounted. Although such braces, beams, platforms, pedestals, stands, etc., are necessary to the construction of the sorting system 10, description of their placement, orientation and interconnections are not necessary for one skilled in the art to easily and fully comprehend the structure, function and operation of the sorting system 10. Particularly, such braces, beams, platforms, pedestals, stands, etc., are clearly illustrated throughout the figures and, as such, their placement, orientation and interconnections are easily understood by one skilled in the art. Therefore, for simplicity, such braces, beams, platforms, pedestals, stands, etc. will be referred to herein merely as system support structures, absent further description of their placement, orientation and interconnections.

Referring now to FIGS. 2A, 2B, 2C and 2D, the tray cart docking station 14 is structured and operable to receive and engage a small object tray cart 38 such that the small object tray cart 38 is temporarily retained, i.e., docked, within the docking station 14. In various implementations, the small object tray cart 38 can include casters, rollers or wheels 42 that allow the cart 38 to be moved from a non-docked location into the docking station 14. Additionally, the small object tray cart 38 includes a plurality of tray guides 46 disposed on, i.e., formed in or attached to, opposing sidewalls 50 of the cart 38. The tray guides 46 are structured and disposed on the opposing sidewalls 50 such that each of a plurality of small object sorting trays 54 can be supported within the cart 38 by opposing guides 46 to thereby removably store each of the trays 54 within the cart 38. Each sorting tray 54 includes a plurality of wells 86, wherein each well 86 is structured to retain a single small object.

In various embodiments, the small object tray cart 38 can be selected from a plurality of like small object tray carts 38, wherein each cart 38 has retained therein selected different sorting trays 54, each sorting tray 54 including a plurality of small objects residing within the respective well 86.

In various embodiments, the small object tray cart 38 can include a tray locking mechanism 58 that is structured and operable to engage each of the small object sorting trays 54 to retain the sorting trays 54 within the cart 38 until such time as the tray locking mechanism 58 is operated to disengage the sorting trays 54. The locking mechanism 58 can be any mechanism, device or assembly operable to retain the sorting trays 54 within the cart 38 and release the trays 54 upon a disengaging operation of the locking mechanism 58. For example, in various embodiments the locking mechanism 58 can include a spring loaded, or otherwise biased, shaft 62 having a plurality of locking arms 66 radially extending from the shaft 62. In such embodiments, the locking arms are spaced apart a distance equal to the spacing between adjacent tray guides 46 and the shaft 62 is biased upward, via a spring or other biasing device, to a locking position wherein each of the locking arms 66 engages a sorting tray 54 supported by a respective set of opposing tray guides 46 (not each set of opposing tray guides necessarily has a sorting tray 54 supported thereon).

For example, when the locking mechanism 58 is in the locking position, each locking arm 66 can engage an appropriate one of a pair of handling channels 70 formed at opposing ends of each sorting tray 54. Additionally, in such embodiments, the locking mechanism 58 can include a release lever 74 radially extending from the shaft 62 through a slot 78 formed in a back of the cart 38. When the cart 38 is docked within the docking station 14, as described below, the release lever 74 is positioned adjacent and in close proximity to a locking mechanism release actuator 82. The locking mechanism release actuator 82 is controllably operable, e.g., via the central controller 34, to push downward on the release lever 74, opposing and overcoming the upward biasing force on the shaft 62, thereby disengaging the locking arms 66 from the handling channels 70 of each tray 54 retained within the cart 38. Accordingly, once the cart 38 is docked in the docking station 14, the locking mechanism 58 is disengaged, via the release actuator 82, so that each of the trays 54 can be selectively removed from the cart 38 by the tray removal and positioning subsystem 18, as described below.

Figure 2A:
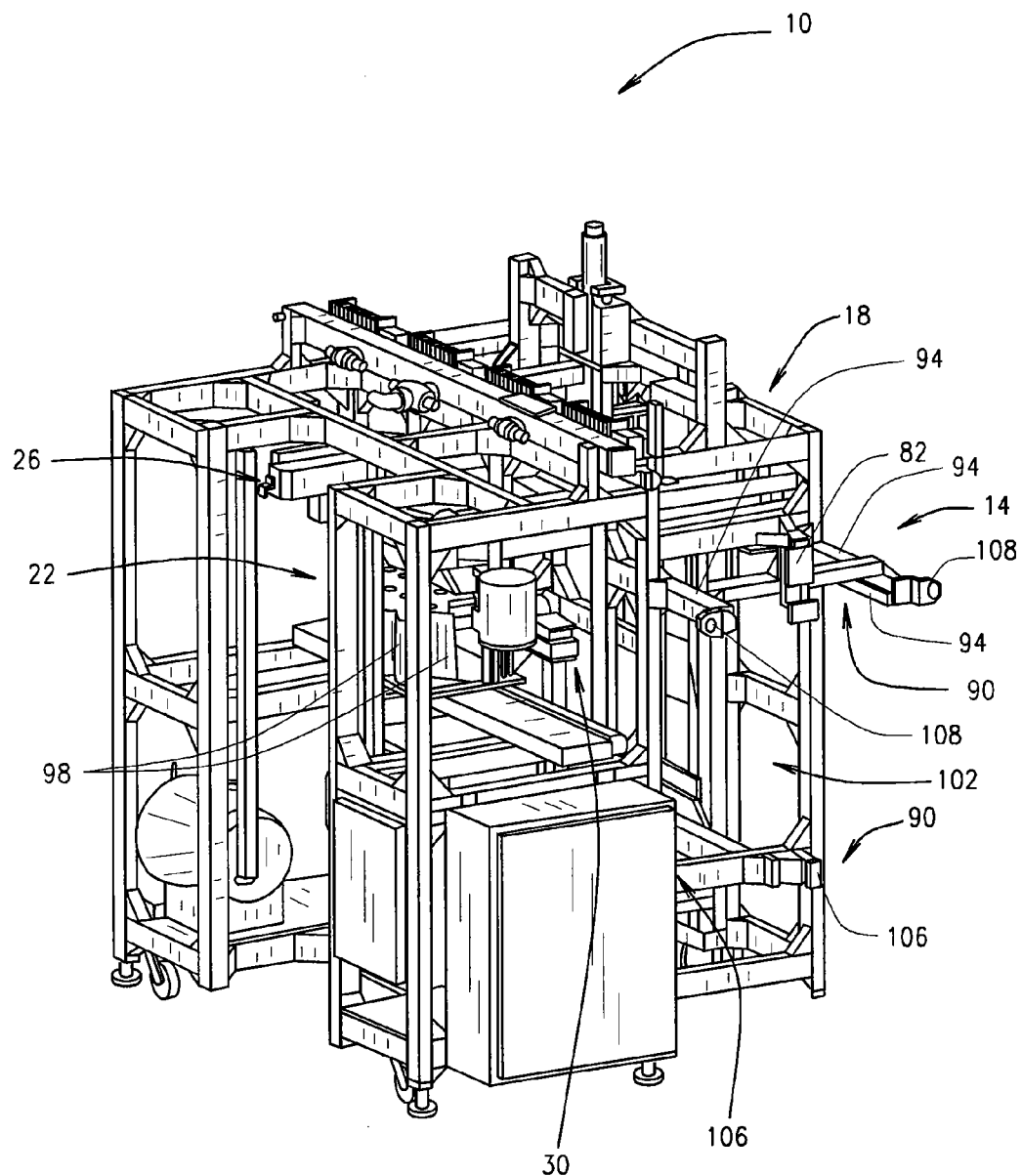
FIG. 2A is an isometric view of the automated small object sorting system shown in FIGS. 1A and 1B, illustrating a small object tray cart docking station, in accordance with various embodiments of the present disclosure.
Figure 2B:
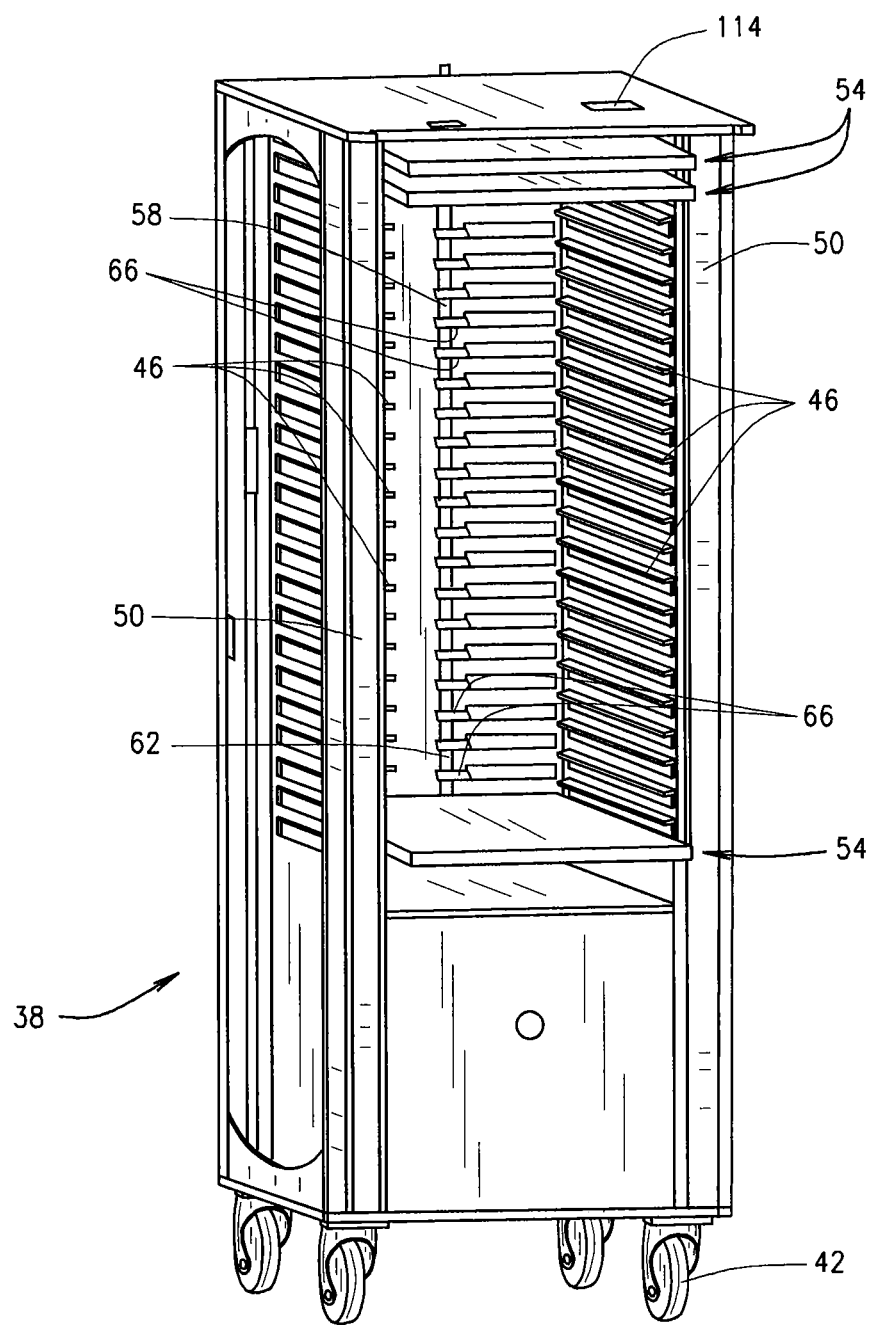
FIG. 2B is an isometric view of a front side of a small object tray cart structured to be docked within the docking station shown in FIG. 2A, in accordance with various embodiments of the present disclosure.
Figure 2C:
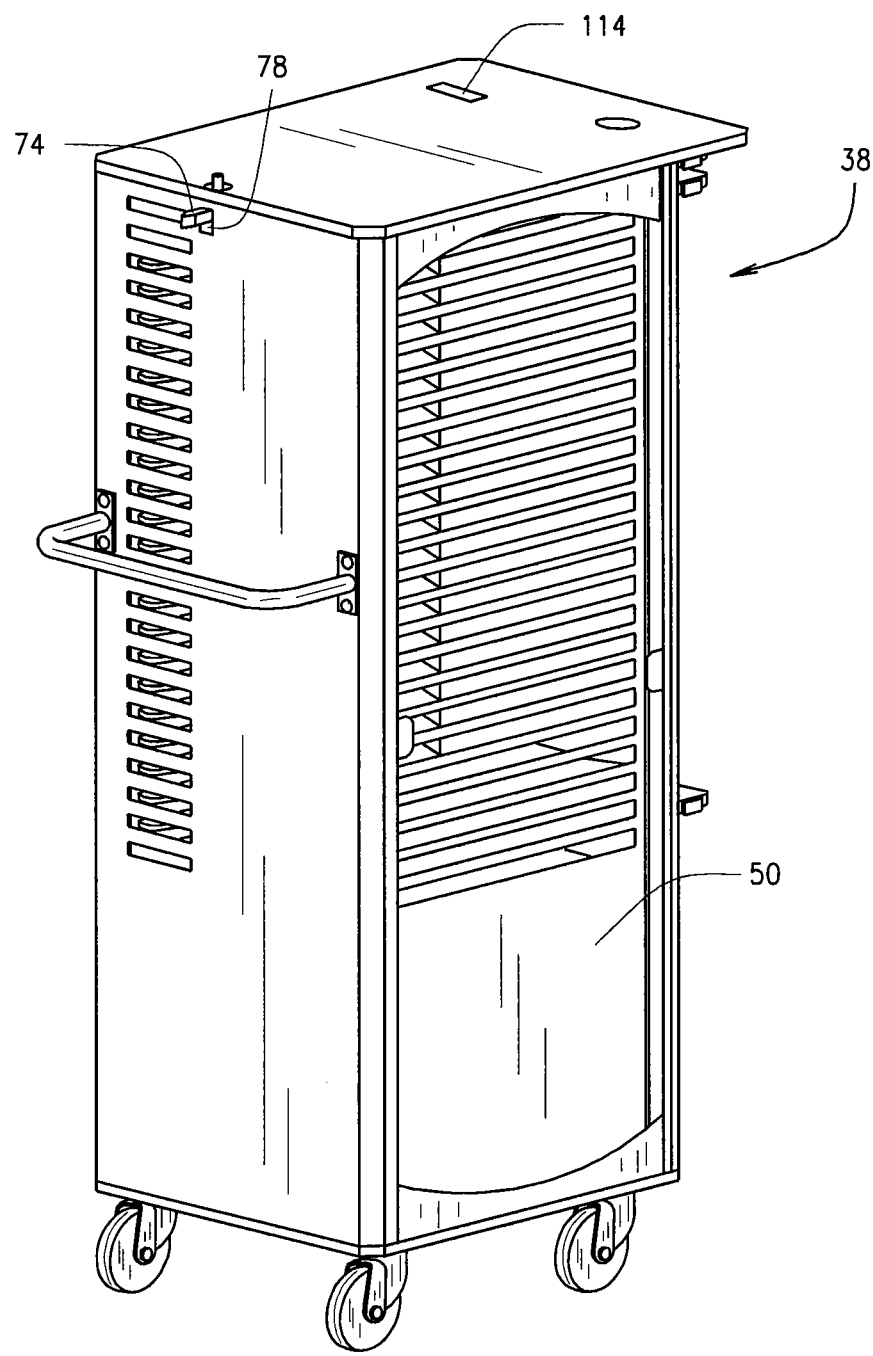
FIG. 2C is an isometric view of a back side of the small object tray cart shown in FIG. 2B, in accordance with various embodiments of the present disclosure.

Referring particularly to FIG. 2A, as described above, the sorting system 10 is operable to sort small objects and deposit the sorted objects into selected receptacles based on particular attributes of each sorted object, e.g., characteristics and/or traits such as size, shape, color, composition, quality, weight, genetic traits, etc. More specifically, the sorting system 10 is structured and operable to receive the small object tray cart 38 in the docking station 14, automatically remove selected sorting trays 54 from the cart 38, extract selected small objects from each removed sorting tray 54, and deposit each extracted small object into selected receptacles 98 removably disposed on, or within, a collection assembly 100 of the collection assembly positioning subsystem 22.

Hence, to utilize the sorting system 10 to sort the small objects stored within the sorting trays 54 of the cart 38, the cart 38 must be positioned within the docking station 14, either manually or via automation. The docking station 14 includes a cart receiving assembly 90 that is structured and operable to locate and retain the cart 38 in a specific position and orientation relative to the tray removal and positioning subsystem 18. In various embodiments, the cart receiving assembly 90 includes a pair of opposing upper guide arms 94 spaced apart a distance substantially equal to the width of the cart 38, i.e., the distance between the outer surfaces of the opposing cart sidewalls 50. As the cart 38 is being positioned within the docking station 14, e.g., as the cart 38 is being pushed into the docking station 14, the guide arms 94 guide the cart 38 into the docking station 14 such that cart 38 is positioned and oriented with a front of the cart 38 adjacent a ingress/egress window 102 of the tray removal and positioning subsystem 18, and an exposed leading edge of each sorting tray 54 extends into the ingress/egress window 102, hereafter referred to as the cart 38 being in the docked position or being docked.

The cart receiving assembly 90 further includes a pair of opposing cart stabilizers 106 that engage the opposing sidewalls 50 to retain the cart 38 in the docked position. In various embodiments, each cart stabilizer 106 can comprise a pliable roller that frictionally engages and slightly protrudes into a recess, groove, raised lip, or channel formed at the leading edge of each respective sidewall 50 when the cart 38 is fully engaged in the docked position. Additionally, the cart receiving assembly 90 includes one or more cart locks 108 that are operable to secure the cart 38 within the docking station 14, i.e., secure the cart 38 in the docked position. The cart locks 108 can be any device, mechanism, apparatus or latch structured and operable to firmly retain the cart 38 within the docking station 14 during operation of the sorting system 10, e.g., as the trays 54 are being removed and replaced from the cart 38 by the tray removal and positioning subsystem 18, as described below. For example, in various embodiments, the one or more cart locks 108 can comprise solenoids mounted at distal ends of the guide arms 94 that are electrically actuated to extend a piston, plunger or rod that physically contacts the cart 38, e.g., a back side of the cart 38, to securely maintain and stabilize the cart 38 within the docking station 14. Or, in other exemplary embodiments, the one or more cart locks 108 can comprise biased pistons, plungers or rods mounted at distal ends of the guide arms 94 that are manually operated to physically contact the cart 38 to securely maintain and stabilize the cart 38 within the docking station 14.

Figure 2D:
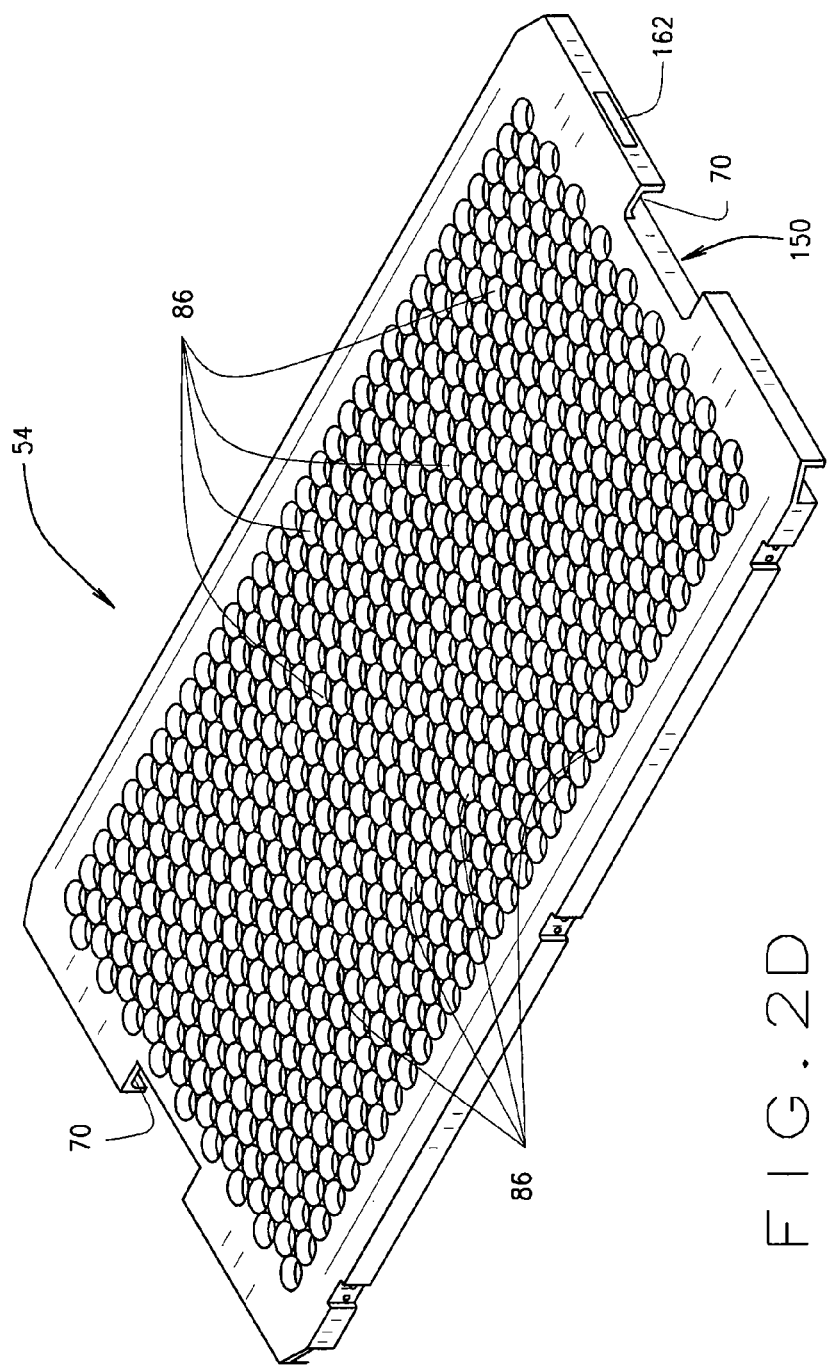
FIG. 2D is an isometric view of a small object sorting tray structured to be stored in the small object tray cart shown in FIGS. 2B and 2C, and retain small objects sorted by the automated small object sorting system shown in FIGS. 1A and 1B, in accordance with various embodiments of the present disclosure.
Figure 2E:
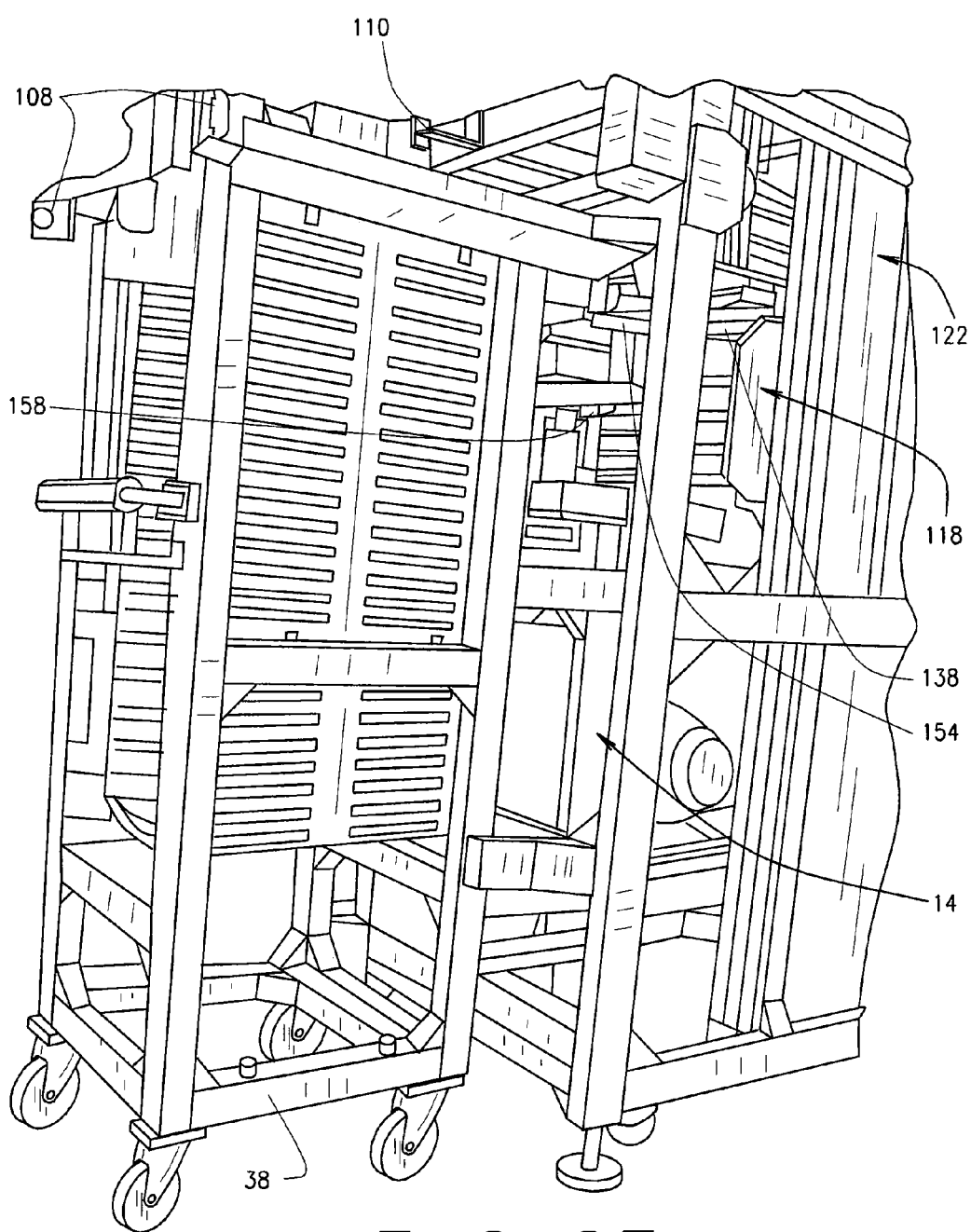
FIG. 2E is an isometric view of the docking station shown in FIG. 2A having a small object tray cart docked therein, in accordance with various embodiments of the present disclosure.

Referring additionally to FIG. 2E, in various embodiments, the docking station 14 further includes a cart information device reader 110 that is structured and operable to read a cart information device 114 affixed to the cart 38, e.g., affixed to a top surface of the cart 38. The cart information device 114 can include various information and/or data regarding or pertaining to the cart 38, the one or more sorting trays 54 stored in the cart 38 and/or the particular small objects stored in the respective sorting tray(s) 54. For example, in various embodiments, the cart information device 114 can provide a coded list identifying each of one or more sorting trays 54 stored in the cart 38. Therefore, once the cart 38 is docked, the central control system 34 communicates with and controls the cart information device reader 110 to read the cart information device 114 and receive the information/data thereby provided. The cart information/data read and received is utilized to as data inputs to one or more system control algorithm, or program, executed by the central control system 34 to control the operation of the sorting system 10, as described below. The read cart information/data can be, at least temporarily, compiled and stored in any desirable format, for example, the cart information/data can be stored in one or more electronic databases, spreadsheets and/or look-up tables accessible and readable by the central control system 34.

The cart information device 114 can be any machine-readable identification device, label or tag suitable for containing or storing information and data, readable or retrievable by the cart information device reader 110, regarding or pertaining to the cart 38, the one or more sorting trays 54 stored in the cart 38 and/or the particular small objects stored in the respective sorting tray(s) 54. For example, in various implementations, the cart information device 114 can comprise a two-dimensional matrix code or other machine-readable label, tag or device, such as a radio frequency identification (RFID) tag or a bar code label, from which the information/data can be received and interpreted via wireless communication such as optical signals, e.g., infrared signals, or magnetic fields. Similarly, the cart information device reader 110 can be any device suitable for reading the cart information device 114, i.e., retrieving the information/data contained in the cart information device 114, and communicating the retrieved information/data to the central control system 34. For example, in various implementations, the cart information device reader 110 can comprise a device structured and operable to read a two-dimensional matrix code or other machine-readable label, tag or device, such as an RFID tag reader or a bar code label reader, operable to read the information/data stored in the respective cart information device 114 via wireless communication such as optical signals, e.g., infrared signals, or magnetic fields.

Figure 3B:
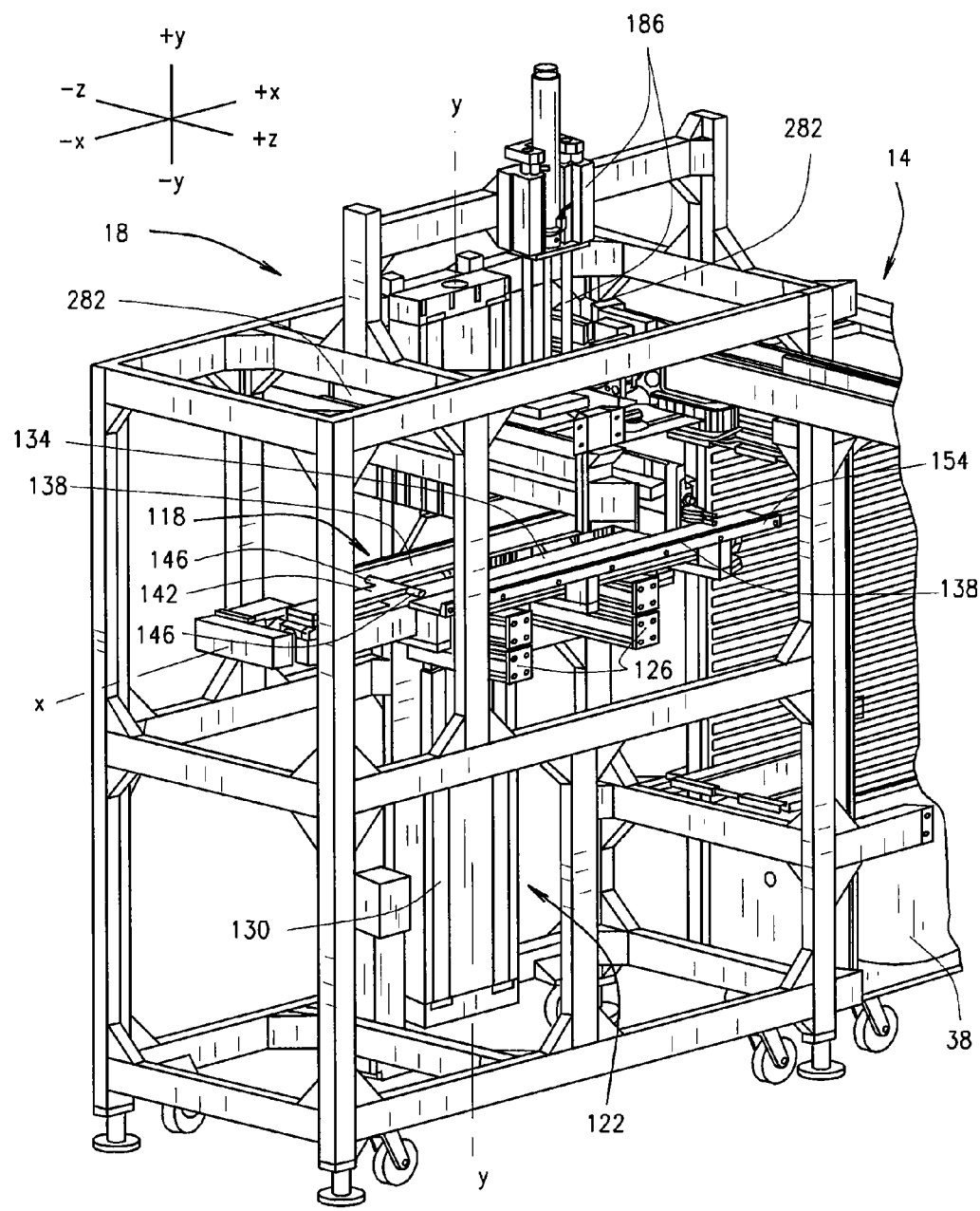
FIG. 3B is an isometric view of the tray removal and positioning subsystem shown in FIG. 3A illustrating a tray shuttle fixture, in accordance with various embodiments of the present disclosure.
Figure 3C:
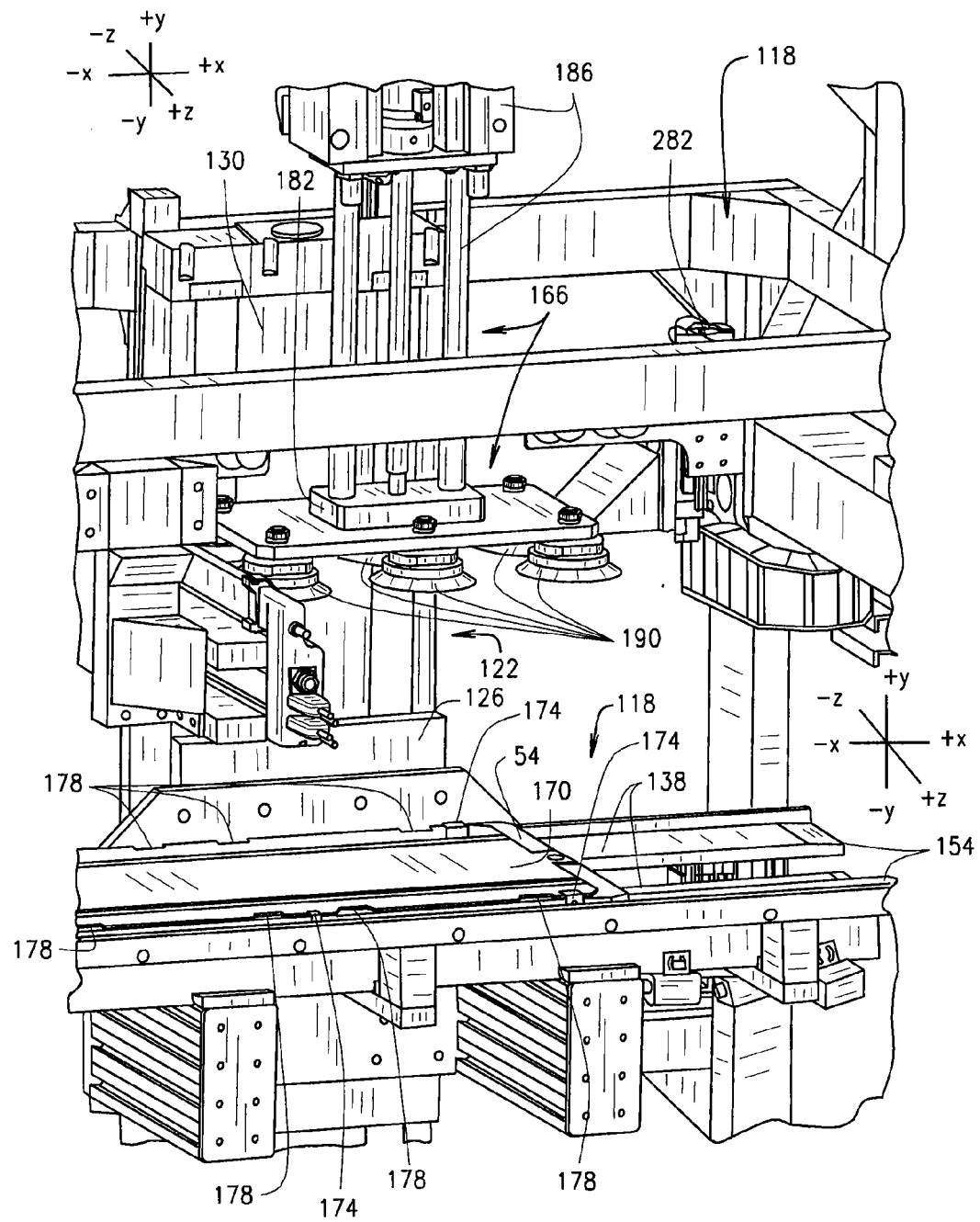
FIG. 3C is an isometric view of the tray removal and positioning subsystem shown in FIG. 3A illustrating a tray lid removal assembly, in accordance with various embodiments of the present disclosure.

Referring now to FIGS. 3A, 3B and 3C, the tray removal and positioning subsystem 18 is structured and operable to remove the small object trays 54 from the small object tray cart 38, controllably position each removed tray 54 such that selected ones of the small object can be extracted therefrom, and replace each tray 54 into the cart 38 after the selected small objects have been extracted. More particularly, the tray removal and positioning subsystem 18 includes a tray locating assembly 118 that is structured and operable, as controlled by the central control system 34, to sequentially remove selected trays 54 from the docked cart 38, controllably position each removed tray 54 along a longitudinal axis of the tray locating assembly 118 and reinsert each removed tray 54 into the docked cart 38 after selected small objects have been extracted from each respective tray 54. Additionally, the tray removal and positioning subsystem 18 includes a tray locating assembly lift 122 that is structured and operable, as controlled by the central control system 34, to selectively raise and/or lower the tray locating assembly 118.

Specifically, the tray locating assembly lift 122 is operable to selectively move the tray locating assembly 118 along a longitudinal axis of the tray locating assembly lift 122 such that tray locating assembly 118 is controllably positioned adjacent each tray 54 to be removed from the cart 38. Furthermore, the tray locating assembly lift 122 is structured and operable to selectively raise and/or lower the tray locating assembly 118 in coordination with the operation of the tray locating assembly such that selected small objects can be removed from each tray 54 by the small object extraction subsystem 26, as described below.

The tray locating assembly lift 122 includes a support fixture 126 and a Y-axis elevator 130. The support fixture 126 is movably mounted to the elevator 130 and the tray locating assembly 118 is fixedly mounted to the support fixture 126. The elevator 130 is controllable by the central control system 34 to bi-directionally move the tray locating assembly 118 along the longitudinal axis of the elevator 130, i.e., in the $^+Y$ and $^-Y$ directions. That is, the elevator 130 is operable to raise and lower the tray locating assembly 118, as controlled by the central control system 34. The elevator 130 can be any assembly, system or mechanism structured and operable to controllably move the tray locating assembly 118 bi-directionally along the longitudinal axis of the elevator 130. For example, in various embodiments, the elevator 130 can comprise a pneumatically, hydraulically or electrically controlled threaded shaft system, wire or cable pulley system, piston system, conveyor belt system, linear motor, or any other suitable positioning system structured and operable to move the tray locating assembly 118 bi-directionally along the longitudinal axis of the elevator 130, as controlled by the central control system 34.

In various embodiments, the tray locating assembly 118 includes a shuttle translation stage 134 disposed between a pair of opposing tray support rails 138 structured to support sorting trays 54 as they are removed from the small object tray cart 38 by the tray locating assembly 118. The tray locating assembly 118 additionally includes a tray shuttle 142 movably mounted to the shuttle translation stage 134 and is structure and operable to engage each selected sorting tray 54 such that each respective sorting tray 54 can be removed from the cart 38, controllably position each removed sorting tray 54 on the tray locating assembly 118, and replace each sorting tray 54 into the cart 38.

The shuttle translation stage 134 is controllable by the central control system 34 to bi-directionally move the tray shuttle 142 along the longitudinal axis of the shuttle translation stage 134, i.e., in the $^+$X and $^-$X directions. Particularly, the shuttle translation stage 134 is operable, in coordination with operation of the elevator 130, to selectively remove sorting trays 54 from the tray cart 38, controllably position the removed sorting trays 54 along the length of the tray support rails 138 such that selected small objects can be extracted from each removed sorting tray 54 by the small object extraction subsystem 26, and replace, or reinsert, the sorting trays 54 into the cart 38. The shuttle translation stage 134 can be any assembly, system or mechanism structured and operable to controllably move the tray shuttle 142 bi-directionally along the longitudinal axis of the shuttle translation stage 134, thereby removing, positioning and replacing the sorting trays 54. For example, in various embodiments, the shuttle translation stage 134 can comprise a pneumatically, hydraulically or electrically controlled threaded shaft system, wire or cable pulley system, piston system, conveyor belt system, a linear motor, or any other suitable positioning system (not shown) that is structured and operable to bi-directionally move the tray shuttle 142 along the longitudinal axis of the shuttle translation stage 134, as controlled by the central control system 34.

As best seen in FIG. 3B, the tray shuttle 142 includes a tray handling bar 146 disposed at a distal end of the tray shuttle 142, i.e., disposed at the end of the tray shuttle 142 nearest the docking station 14. The tray handling bar 146 is structure to fit within the tray handling channels 70 of each sorting tray 54 (shown in FIG. 2D). As shown in FIG. 2D, the tray handling channels 70 include a window 150, i.e., a gap, space, or opening, that is sized to accommodate a neck portion 154 of the tray shuttle 142. Hence, by coordinated operation of the elevator 130 and the shuttle translation stage 134, as controlled by the central control system 34, the tray handling bar 146 can be positioned within and engage the tray handling channel 70. Therefore, via the engagement of the tray handling bar 146 within the tray handling channel 70, the tray shuttle 142 can be controllably positioned along the shuttle translation stage 134 to remove a selected sorting tray 54 from the cart 38, controllably position the removed sorting tray 54 along the tray support rails 138 as selected small objects are extracted from the removed sorting tray 54, and replace the removed sorting tray 54 into the cart 38 after the selected small objects have been extracted.

More specifically, to remove a selected sorting tray 54 from a docked cart 38, the central control system 34 controls the operation of the elevator 130 and the shuttle translation stage 134 to move the tray shuttle 142 at or near a leading end 154 of the tray support rails 138 such that the tray handling bar 146 is adjacent and slightly below the tray handling channel 70 of a selected sorting tray 54. The shuttle translation stage 134 is then operated to slightly move the tray shuttle 142 in the $^+$X direction such that the tray handling bar 146 is directly below the tray handling channel 70 of the selected sorting tray 54. The elevator 130 is then operated to slightly raise the tray shuttle 142 and tray support rails 138 in the $^+$Y direction such that the tray handling bar 146 is disposed within and engages the tray handling channel 70 of the selected sorting tray 54. Subsequently, the shuttle translation stage 134 is operated to move the tray shuttle in the $^-$X direction, whereby the tray handling bar 146, via engagement with the tray handling channel 70, pulls the selected sorting tray 54 out of the docked tray cart 38 such that the selected sorting tray 54 is supported on tray support rails 138.

Additionally, via engagement of the tray handling bar 146 with the tray handling channel 70, the shuttle translation stage 134 can be operated to controllably position the removed sorting tray 54 anywhere along the length of the tray support rails 138, and the elevator 130 can be operated to controllably raise and/or lower removed sorting tray 54 in order to position the removed sorting tray 54 for extraction of selected small objects, as described below. Once all the selected small objects have been extracted from the removed sorting tray 54, the shuttle translation stage 134 and the elevator 130 can be operated to position the tray support rails 138 adjacent opposing tray guides 46 of the docked tray cart 38 and push the removed sorting tray 54 onto the tray guides 46, thereby replacing the removed sorting tray 54 back into the docked tray cart 38.

Referring additionally to FIGS. 2D and 2E, in various embodiments, the tray locating assembly 118 can include a tray information device reader 158 that is structured and operable to read a tray information device 162 affixed to each sorting tray 54. In various embodiments each tray information device 162 can be affixed to an exterior edge of the respective tray handling channel 70 and the tray information device reader 158 can be affixed to an end of the shuttle translation stage 134 near the docking station 14, or any other location on the tray locating assembly 118 near the docking station 114.

Each tray information device 162 can include various information and data regarding or pertaining to the small objects residing the wells 86 of the respective sorting tray 54. For example, in various embodiments, each tray information device 162 can provide coded information identifying each small object within the respective sorting tray 54 and detailing particular attributes of each small object within the respective sorting tray 54, e.g., characteristics and/or traits such as size, shape, color, composition, quality, weight, genetic traits, etc. Additionally, each tray information device 162 can provide information identifying the location, e.g., Cartesian coordinates, of each respective small object within the respective sorting tray 54, more particularly, the location of the respective well 86 in which each small object resides. Therefore, once the cart 38 is docked, the central control system 34 communicates with and controls the tray locating assembly 118 and the tray information device reader 158 to read the tray information device 162 of each sorting tray 54 stored in the cart 38 and receive the information thereby provided. The information read and received is utilized as data inputs to the one or more system control algorithms, or programs, executed by the central control system 34 to control the operation of the sorting system 10, e.g., the extraction of selected small objects from selected ones of the sorting trays 54 stored in the cart 38, as described below. The tray information/data can be, at least temporarily, compiled and stored in any desirable format, for example, the cart information/data can be stored in one or more electronic databases, spreadsheets and/or look-up tables accessible and readable by the central control system 34.

As described above, the cart information device 114 can include various information and data regarding or pertaining to the cart 38 and the one or more sorting trays 54 stored in the cart 38. For example, in various embodiments, the cart information device 114 can include information identifying the particular sorting trays 54 that are stored in the respective cart 38. In such embodiments, once the cart 38 is docked, as described above, the cart information device 114 can be read by the cart information device reader 110 to obtain the information identifying the particular sorting trays 54 that are stored in the respective cart 38. Subsequently, the elevator 130 of the tray removal and positioning subsystem 18 can be operated to raise and/or lower the shuttle translation stage 134 such that the tray information device reader 158 can read the tray information device 162 of each sorting tray 54 stored in the cart 38 to obtain information identifying each of the sorting trays 54. The tray identification information acquired from each of the tray information devices 162 can then be compared, via the central control system 34, with the information acquired from cart information device 114 to verify that the respective cart 38 has the correct sorting trays 54 stored therein.

Each tray information device 162 can be any machine-readable identification device, label or tag suitable for containing or storing information and data, readable or retrievable by the tray information device reader 158, regarding or pertaining to the respective sorting tray 54 and the respective small objects residing therein. For example, in various implementations, each tray information device 162 can comprise a two-dimensional matrix code or other machine-readable label, tag or device, such as a radio frequency identification (RFID) tag or a bar code label, from which the information/data can be received and interpreted via wireless communication such as optical signals, e.g., infrared signals, or magnetic fields. Similarly, the tray information device reader 158 can be any device suitable for reading the tray information devices 162, i.e., retrieving the information/data contained in each tray information device 162, and communicating the retrieved information/data to the central control system 34. For example, in various implementations, the tray information device reader 158 can comprise a device structured and operable to read a two-dimensional matrix code or other machine-readable label, tag or device, such as an RFID tag reader or a bar code label reader, operable to read the information/data stored in each tray information device 162 via wireless communication such as optical signals, e.g., infrared signals, or magnetic fields.

Referring particularly to FIG. 3C, in various embodiments, the automated tray removal and positioning subsystem 118 includes an automated tray lid removal assembly 166 that is structured and operable to remove a lid 170 from each sorting tray 54 removed from the docked cart 38 and replace the lid 170 prior to replacing the sorting tray 54 into the docked cart 38. More particularly, in various embodiments, each sorting tray 54 stored in the cart 38 has a respective lid 170 removably connected thereto. Each lid 170 operates to retain each of the small objects within the wells 86 of the respective sorting tray 54. Each lid 170 can be removably connected to the respective sorting tray 54 using any suitable connecting or fastening means.

For example, in various implementations, each sorting tray 54 can include a plurality of L-shaped spring clips 174 attached to opposing longitudinal sides of the sorting tray 54, and each lid 170 can include a plurality of mating cutouts 178. In such implementations, each lid 170 can be installed on, or connected to, the respective sorting tray 54 by positioning the lid 170 onto a top surface of the respective sorting tray 54 such the cutouts 178 are placed around the tray spring clips 174. The lid 170 can then be slid across the tray top surface such that perimeter edges of the lid 170 slide under the spring clips 174, thereby removably connecting the lid 170 to, or retaining the lid 170 on, the respective sorting tray 54. To remove the lid 170 from the respective sorting tray 54 the process is reversed, whereby the lid 170 is slid across the tray top surface until the cutouts 178 align with the spring clips 174 such that the lid 170 can then be lifted or removed from the respective sorting tray 54.

In various embodiments, the lid removal assembly 166 includes a vacuum cup head 182 mounted to a distal end of a linear actuator 186, e.g., a pneumatic actuator, mounted to system support structure such that the vacuum cup head 182 is positioned above the tray support rails 154 of the tray locating assembly 118. The actuator 186 is operable, as controlled by the central control system 34, to raise and lower the vacuum cup head 182 in the $^+Y$ and $^-Y$ directions. The vacuum cup head 182 includes a plurality of vacuum cups 190 one or more of which are connected to one or more of the vacuum regulators 37 such that a controlled vacuum can be provided at selected vacuum cups 190.

As described above, tray lid removal assembly 166 is structured and operable to remove the lid 170 from each sorting tray 54 removed from the docked cart 38 by the tray removal and positioning subsystem 18 and replace the lid 170 prior to the sorting tray 54 being replaced into the docked cart 38 by the tray removal and positioning subsystem 18. More particularly, after a sorting tray 54 having a lid 170 connected thereto (the tray-lid assembly 54/170) is removed from the cart 38, the tray locating assembly 118 moves the tray-lid assembly 54/170 along the tray support rails 138 to a position directly beneath the vacuum cup head 182. Additionally, the tray locating assembly lift 122 raises or lowers the tray locating assembly 118 such that the tray-lid assembly 54/170 is positioned at a particular height, i.e., a particular distance from the vacuum cup head 182.

The actuator 186 is then operated, as controlled by the central control system 34, to lower the vacuum cup head 182 to a position wherein the vacuum cups 190 are in contact with the lid 170 of the tray-lid assembly 54/170. A vacuum is then provided at one or more of the vacuum cups 190 and the actuator is operated to raise the vacuum cup head 182, thereby removing the lid 170 from the tray-lid assembly 54/170. In various implementations, wherein the lid 170 is connected to the sorting tray 54 via the spring clips 174, as described above, once the vacuum cups 190 are placed on contact with the lid 170 and the vacuum is applied at the vacuum cup(s) 170, the vacuum cup head 182 can be slightly raised, or the tray locating assembly 118 can be slightly lowered, slightly separate at least a portion of the lid 170 from the sorting tray 54 to break any static electric bond or vacuum formed between the lid 170 and the sorting tray 54. The tray locating assembly 118 is then operated to move the sorting tray 54 in the $^+X$ or $^-X$ direction, as the lid 170 is held stationary by the vacuum cup head 182, such that the lid cutouts 178 align with the respective L-shaped spring clips 174. That is, the sorting tray 54 is moved such that the perimeter edge of the lid 170 is slid under the spring clips 174 until the cutouts 178 align with the spring clips 174, thereby disconnecting, or disengaging the lid 170 from the sorting tray 54. Subsequently, the actuator 186 can be operated to raise the vacuum cup head 182 while the vacuum continues to be applied to the vacuum cup(s) 190 such that the lid 170 is lifted off of and away from the sorting tray 54. The lid 170 is raised to a parked position that is a sufficient distance above the sorting tray 54 to allow access by the small object extraction subsystem 26 to the small objects residing in the tray wells 86. The selected small objects can then be extracted by the small object extraction subsystem 26 as described below.

Figure 4A:
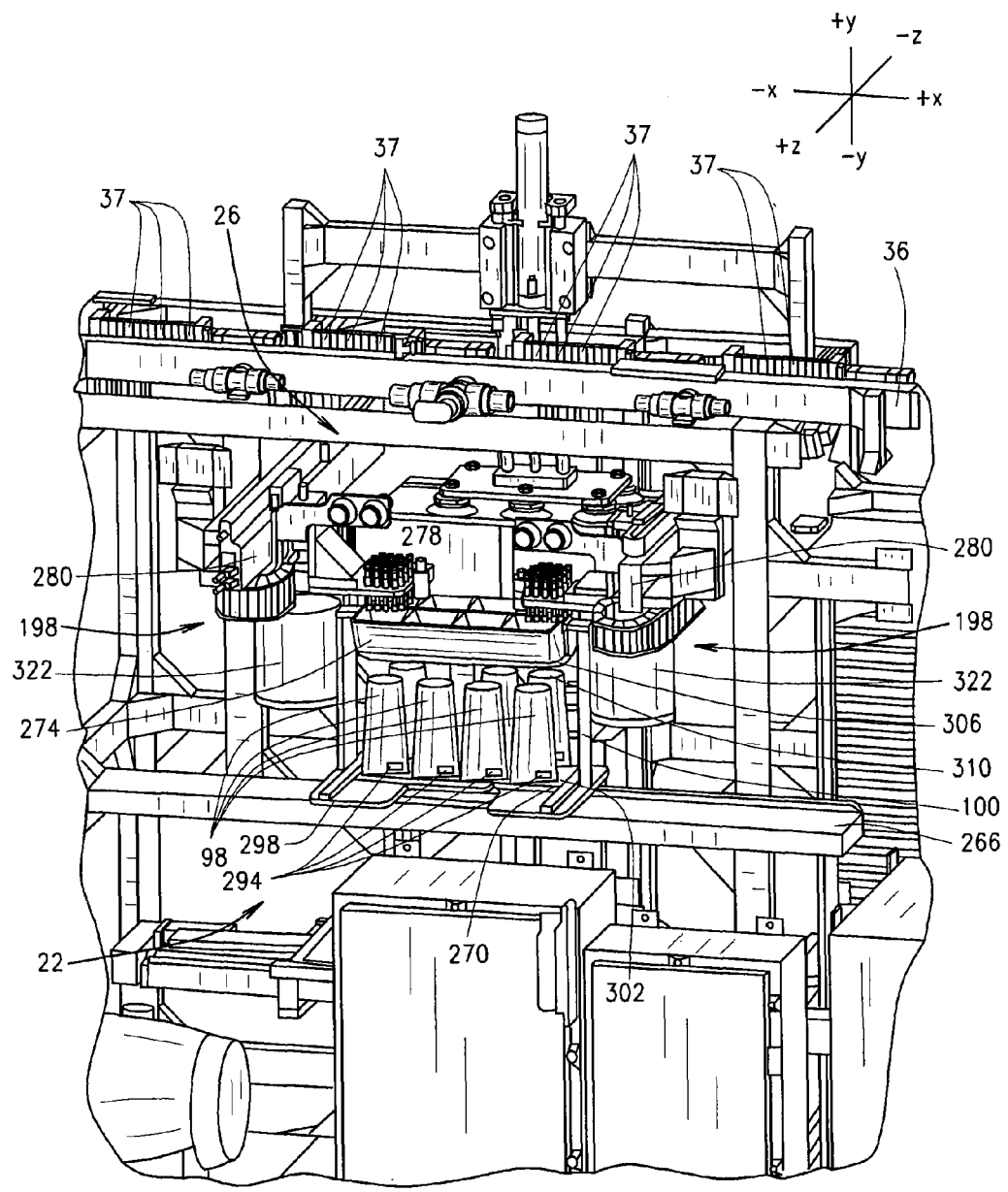
FIG. 4A is an isometric view of a collection assembly positioning subsystem and a small object extraction subsystem of the small object sorting shown in FIGS. 1A and 1B, in accordance with various embodiments of the present disclosure.

Referring now to FIGS. 4A, 4B, 4C and 4D, the automated small object extraction subsystem 26 is structured and operable to extract one or more selected small objects from each sorting tray 54 removed from the cart 38, and deposit each extracted small object into selected small object receptacles 98 removably disposed on, or within, the collection assembly 100 of the collection assembly positioning subsystem 22. The extraction subsystem 26 includes at least one transfer assembly 198 extending between the tray removal and positioning subsystem 18 and the collection assembly positioning subsystem 22. In various embodiments, as illustrated in FIG. 4A, the extraction subsystem 26 can include a pair of opposing transfer assemblies 198 extending between the tray removal and positioning subsystem 18 and the collection assembly positioning subsystem 22 to increase the rate of sorting of the small objects, as described herein. In the embodiments having more than one transfer assembly 198, each transfer assembly is substantially the same in structure and function. Therefore, for simplicity, only a single transfer assembly 198 will be described.

The transfer subassembly 198 includes a nozzle head 202 removably mounted to a nozzle head carriage 206 that is movably mounted to a carriage transporter 210. The carriage transporter 210 is structured and operable, as controlled by the central control system 34, to bi-directionally move the nozzle head carriage 206 and, more particularly, the nozzle head 202 along the longitudinally axis of the carriage transporter 210, i.e., in the $^{+}Z$ and $^{-}Z$ directions, between the tray removal and positioning subsystem 18 and the collection assembly positioning subsystem 22.

The nozzle head carriage 206 includes a base plate 214 extending substantially orthogonally from a back plate 212 that is mounted to a carriage bracket 222. The carriage bracket 222 is slidingly mounted to, or within, tracks 226 of the carriage transporter 210 such that the nozzle head carriage 206 and, more particularly, the nozzle head 202 can be bi-directionally moved along the tracks 226 between the tray removal and positioning subsystem 18 and the collection assembly positioning subsystem 22, as controlled by the central control system 34. Additionally, the nozzle head 202 comprises a mounting plate 230 having an array 234 of vacuum nozzles 238 disposed therein, or attached thereto. Moreover, the vacuum nozzles 238 are geometrically arranged within the nozzle array 234 such that the spacing between radial center points of adjacent nozzles 238 corresponds with the spacing between radial center points of adjacent wells 86 of the respective sorting tray 54.

The nozzle head 202 is removably mounted to the nozzle head carriage 206. More specifically, the nozzle head mounting plate 230 is removably connectable to the carriage base plate 214 using any fastening means, device, component, assembly or system suitable for securely and stably connected the nozzle head 202 to the nozzle head carriage 206 in a fixed position. For example, the nozzle head mounting plate 230 can be removably connected to the carriage base plate 214 utilizing magnets, locking pins, biased clamps or latches, thumb screws, wing nuts and bolts or any other suitable fastener. Therefore, a first nozzle head 202 having a certain number of vacuum nozzles 238, e.g., twelve, of a specific size and spacing, can be easily removed and replaced, i.e., interchanged, with a second nozzle head 202 having a different number of vacuum nozzles 238, e.g., twenty-four, of a different specific size and spacing.

For example, in various embodiments, the nozzle head mounting plate 230 can be removably mounted to the carriage base plate 214, via a magnetic connection. In such embodiments, one or both of the nozzle head mounting plate 230 and the carriage base plate 214 can include one or more magnetic coupling inserts 242 disposed in the interfacing surfaces of the mounting and base plates 230 and 214. The magnetic coupling inserts 242 disposed in the nozzle head mounting plate 230 are fabricated, i.e., have material properties, such that they are magnetically attracted to the magnetic coupling inserts 242 disposed in the carriage base plate 214 and/or vice versa. Moreover, the magnetic coupling inserts 242 are located within the interfacing surfaces such that the magnetic coupling inserts 242 disposed in the nozzle head mounting plate 230 will magnetically mate, or couple, with the magnetic coupling inserts 242 disposed in the carriage base plate 214.

The magnetic coupling inserts 242 can by any insert having magnetic properties suitable to magnetically couple the nozzle head mounting plate 230 to the carriage base plate 214. For example, in various embodiments, the magnetic coupling inserts 242 disposed in the nozzle head mounting plate 230 can comprise magnets of a first polarity and the magnetic coupling inserts 242 disposed in the carriage base plate 214 can comprise magnets of the opposite polarity such that an attractive force is exerted between the opposing magnetic coupling inserts 242 that is utilized to magnetically couple the nozzle head mounting plate 230 to the carriage base plate 214. Alternatively, the magnetic coupling inserts 242 disposed in the nozzle head mounting plate 230 can comprise magnets and the magnetic coupling inserts 242 disposed in the carriage base plate 214 can comprise a ferrous material such that an attractive force is exerted between the magnet inserts 242 and the ferrous material inserts 242 that is utilized to magnetically couple the nozzle head mounting plate 230 to the carriage base plate 214. Or, the magnetic coupling inserts 242 disposed in the nozzle head mounting plate 230 can be a ferrous material and the magnetic coupling inserts 242 disposed in the carriage base plate 214 can comprise magnets such that an attractive force is exerted between the magnet inserts 242 and the ferrous material inserts 242 that is utilized to magnetically couple the nozzle head mounting plate 230 to the carriage base plate 214.

Additionally, in various embodiments, to securely and stably connect the nozzle head 202 to the nozzle head carriage 206 in a fixed position, the carriage base plate 214 and/or the nozzle head mounting plate 230 can include one or more locating pins 246 that securely mate with locating pin receiving wells 250 formed in respective opposing carriage base plate 214 and/or the nozzle head mounting plate 230. More particularly, when the nozzle head mounting plate 230 is mounted to the carriage base plate 214, as described above, the locating pins 246 securely mate with the receiving wells 250 to maintain the mounting plate 230 and the carriage base plate 214 in fixed position and orientation with respect to each other.

The carriage transporter 210 can be any assembly, system or mechanism structured and operable to controllably move the nozzle head and carriage 202 and 206 bi-directionally along the longitudinal axis of the carriage transporter 210. For example, the carriage transporter 210 can comprise a pneumatically, hydraulically or electrically controlled threaded shaft system, wire or cable pulley system, piston system, conveyor belt system, linear motor, or any other suitable positioning system structured and operable to move the nozzle head and carriage 202 and 206 along the length of the carriage transporter 210, as controlled by the central control system 34. Particularly, in various embodiments, the carriage transporter 210 can comprise a linear motor structured and operable to produce a controllable linear force exerted on the nozzle head carriage bracket 222 to controllably move the nozzle head and carriage 202 and 206 between the tray removal and positioning subsystem 18 and the collection assembly positioning subsystem 22.

Referring particularly to FIGS. 4B and 4C, each of the vacuum nozzles 238 of the nozzle array 234 are communicatively connected to one of the regulators 37 in the pneumatic supply assembly 35. As controlled by the central control system 34, each nozzle regulator 37 provides vacuum signals to each of the respective vacuum nozzles 238, via a corresponding vacuum line 254, e.g., a flexible vacuum line, to activate the respective nozzles 37, as described below. Although each vacuum nozzle 238 is communicatively coupled to a respective nozzle regulator 37 via a corresponding vacuum line 254, for simplicity and clarity only a single vacuum line 254 is shown in FIGS. 4B and 4C. The nozzle regulators 37 are vacuum pressure regulators that monitor, condition and/or modulate vacuum signals communicated to each of the nozzles 238 via the vacuum lines 254. Generally, the nozzle regulators 37 include switches, valves, and sensors to control and regulate the vacuum pressure for each respective nozzle 238.

Generally, each vacuum nozzle 238 includes a tubular body having an internal passage defined therein. Each vacuum line 254 is removably coupled to a proximal end of the respective vacuum nozzle 238. In various embodiments, the proximal end of each vacuum nozzle 238 can include a quick coupling fixture 258 that is structured and operable to allow the respective vacuum line 254 to be easily connected to and removed from the proximal end of the respective vacuum nozzle 238. Accordingly, as controlled by the central control system 34, the regulators 37 regulate vacuum pressure signals communicated, via the vacuum lines 254, to a tip 262 of each respective vacuum nozzle 238. More particularly, a vacuum can be controllably and selectively provided to the tips 262 of selected vacuum nozzles 238 to extract, i.e., remove, one or more selected small objects from the removed sorting tray 54, as described further below. Once the small object(s) have been extracted, the vacuum is maintained at the respective nozzle tips 262 such that the extracted small object(s) are retained on the respective tips 262 while the nozzle head 202 is moved, via the nozzle head carriage transporter 210, from the tray removal and positioning subsystem 18 to the collection assembly positioning subsystem 22. The extracted small objects are then deposited into selected small object receptacles 98, as also described further below.

In various embodiments, each nozzle tip 262 can be customized to optimize handling of each small object as it is extracted from the sorting tray 54 and deposited in the selected receptacle 98. For example, in various embodiments, each nozzle tip 262 can be structured or formed to accommodate the shape of the wells 86 of the sorting tray 54. For example, if the wells 86 have a shallow, rounded, concave shape, each nozzle tip 262 can be structured or formed to have wider rounded convex shape such that each nozzle tip 262 operates more efficiently when extracting an object from the wells 86. Alternatively, if the wells 86 have a deeper, cylindrical, flat bottom shape, each nozzle tip 262 can be structured or formed to have narrow, cylindrical shape with a flat distal end such that each nozzle tip 262 operates more efficiently when extracting an object from the wells 34. Additionally, in various embodiments, each vacuum nozzle tip 262 includes a screen-like device having a plurality of openings spaced apart such that the small objects can be extracted without damaging the object. Furthermore, in various embodiments, each nozzle tip 262 can be interchangeable to meet the handling preferences or requirements of various different small objects.

Referring now to FIG. 4A, the automated collection assembly positioning subsystem 22 is structured and operable to selectively position the collection assembly 100 such that the selected one or more small object extracted from the removed sorting tray 54 can be deposited into the selected one or more of seed receptacles 98. The collection assembly positioning subsystem 22 includes a collection assembly translation stage 266 and the collection assembly 100. The collection assembly 100 is movably mounted to the collection assembly translation stage 266 and is structure and operable to removably retain a multi-receptacle receiving fixture 270 that includes the plurality of small object receptacles 98. The collection assembly 100 additionally includes a multi-funnel small object disposition fixture 274 that includes a plurality of funnels 278 structured to receive the small objects extracted from the removed sorting tray 54 and funnel extracted small objects into the one or more selected small object receptacles 98.

The collection assembly translation stage 266 is controllable by the central control system 34 to bi-directionally move the collection assembly 100, receptacle fixture 270 and receptacles 98 along the longitudinal axis of the collection assembly translation stage 266, i.e., in the $^+$X and $^-$X directions. Particularly, the collection assembly translation stage 266 is operable to position the selected ones of the funnels 278 of the multi-funnel small object disposition fixture 274 directly beneath the nozzle head 202, more particularly, directly beneath the nozzle array 234, positioned at a disposition end 280 of the carriage transporter 210 after the selected small objects have been extracted from the removed sorting tray 54, as described below. In the various embodiments wherein the small object extraction subsystem 26 includes a plurality of transfer assemblies 198, i.e., a plurality of nozzle head carriage transporters 210, the collection assembly translation stage 266 is operable to position the selected funnels 278 directly beneath the nozzle head 202 of each transfer assembly 198 as the respective nozzle head 202 is transported to the respective disposition end 280 of the respective carriage transporter 210.

For example, in embodiments wherein the small object extraction subsystem 26 includes a pair of opposing transfer assemblies 198, i.e., a pair of opposing nozzle head carriage transporters 210, the central control system 34 can control operation of the carriage transporters 210 such that as one carriage transporter 210 positions the respective nozzle head 202 at the respective disposition end 280 to deposit extracted small objects in the receptacles 98, the other carriage transporter 210 is operated to position the respective nozzle head 202 at an extraction end 282 (shown in FIG. 3B) of the respective carriage transporter 210 to extract small objects from the removed sorting tray 54. Hence, as each nozzle head 202 is transported to the disposition end 280 of the respective carriage transporter 210, the collection assembly translation stage 266 is operated to position the selected ones of the funnels 278 directly beneath the respective nozzle head 202, more particularly beneath the respective nozzle array 234, at the disposition end 280 of the respective carriage transporter 210. As described above, in the embodiments having more than one transfer assembly 198, each transfer assembly is substantially the same in structure and function. Therefore, for simplicity, cooperative operation of tray removal and positioning subsystem 18, the collection assembly positioning subsystem 22 and the small object extraction subsystem 26 will be described herein with reference to only a single transfer assembly 198.

The collection assembly translation stage 266 can be any assembly, system or mechanism structured and operable to controllably move the collection assembly 100, receptacle fixture 270 and receptacles 98 bi-directionally along the longitudinal axis of the collection assembly translation stage 266. For example, the collection assembly translation stage 266 can comprise a pneumatically, hydraulically or electrically controlled threaded shaft system, wire or cable pulley system, piston system, conveyor belt system, linear motor, or any other suitable positioning system structured and operable to move the collection assembly 100, receptacle fixture 270 and receptacles 98 along the length of collection assembly translation stage 266, as controlled by the central control system 34. Particularly, in various embodiments, the collection assembly translation stage 266 can comprise a linear motor structured and operable to produce a controllable linear force exerted on the collection assembly 100 to controllably position the selected ones of the collection assembly funnels 278 beneath the nozzle head 202 position at the disposition end 280 of the carriage transporter 210, whereby the one or more extracted small objects can be deposited into the selected ones of the receptacles 98.

Referring now to FIGS. 3A, 3B, 3C and 4A, once a selected sorting tray 54 is removed from the cart 38 by the tray removal and positioning subsystem 18, as described above, the central control system 34 executes the one or more system control algorithms to coordinated the operation of the tray removal and positioning subsystem 18 and the small object extraction subsystem 26 to extract selected small objects from the removed sorting tray 54. More particularly, the central control system 34 utilizes selection data input to the central control system 34 prior to initiation of the operation of the sorting system 10 and the sorting tray identification data and small object identification data acquired by the cart information device reader 110 and the tray information device reader 158 to sequentially remove particular sorting trays 54 from the cart 38 and extract particular small objects from each removed sorting tray 54. Still more specifically, the selection data stipulates which small objects stored in the cart 38 are to be extracted and deposited, i.e., sorted, into the small object receptacles 98. Then, utilizing the sorting tray information/data and small object identification data acquired by the cart information device reader 110 and the tray information device reader 158, as described above, the particular sorting trays 54 storing the stipulated small objects to be sorted into the receptacles 98 are sequentially removed from the cart 38 and the stipulated small objects are extracted.

To extract the selected small objects from each removed sorting tray 54, i.e., the small objects stipulated to be extracted by the selection data input to the central control system 34, the central control system 34 controls the operation of the tray removal and positioning subsystem 18 and the small object extraction subsystem 26 as follows. The carriage transporter 210 is operated to transport the nozzle head 202 to or near the extraction end 282 of the carriage transporter 210. At, or about, the same time, the tray locating assembly 118 and the tray locating assembly lift 122 are operated to position the small objects stipulated for extraction, i.e., the selected small objects, at or near a location beneath the carriage transporter extraction end 282.

More specifically, utilizing the known location of each small objects within the removed sorting tray 34, as provided by the small object identification data acquired by the tray information device reader 158, the following movements of the tray removal and positioning subsystem 18 and the small object extraction subsystem 26 are coordinated to position one or more of the small objects stipulated for extraction, i.e., one or more of the selected small objects, directly beneath and in close proximity to the nozzle tips 262 of the nozzle array 234 positioned at, or near, the carriage transporter extraction end 282.

The removed sorting tray 34 is moved along the tray support rails 138 in the $^+$X and/or $^-$X direction to position one or more of the selected small objects in alignment, in the $^+$Z and $^-$Z direction, with the nozzle head 202. The nozzle head 202 is then moved in the $^+$Z and/or $^-$Z direction, as needed, to locate one or more selected small objects directly beneath and in close proximity to the nozzle tips 262 of the nozzle array 234. That is, the tip 262 of each of nozzles 238 in the nozzle array 234 is directly above a corresponding one of the sorting tray wells 86 and in close proximity to the respective small object residing in each of the corresponding wells 86, one, some or all of which are selected small objects.

Alternatively, the nozzle head 202 can be moved in the $^+$Z and/or $^-$Z direction to position one or more of the selected small objects in alignment, in the $^+$X and $^-$X direction, with the nozzle head 202. The removed sorting tray 34 is then moved along the tray support rails 138 in the $^+$X and/or $^-$X direction, as needed, to position one or more selected small objects directly beneath and in close proximity to the nozzle tips 262 of the nozzle array 234. Hence, the tip 262 of each of nozzle 238 in the nozzle array 234 is directly above a corresponding one of the sorting tray wells 86 and in close proximity to the respective small object residing in each of the corresponding wells 86, one, some or all of which are selected small objects.

In various embodiments, once the one or more small objects stipulated for extraction are positioned directly beneath and in close proximity to the nozzle tips 262 of the nozzle array 234, the tray locating assembly lift elevator 130 can be operated to slightly raise the removed sorting tray 54 such that the tip 262 of each nozzle 238 lightly contacts the small object residing in each of the corresponding wells 86.

The central control system 34 then commands selected regulators 37 to communicate a vacuum pressure to the tip 262 the nozzles 238 corresponding to the one or more small objects stipulated for extraction. Hence, one, some or all of the nozzles 238 can be activated by the central control system 34, i.e., one, some or all of the nozzles 238 can be provided with a vacuum pressure at the respective tip 262, depending on the number of corresponding small objects that are to be extracted. Although a single nozzle 238 can be activated to extract a single small object, extraction of the one or more small objects will be described herein in the plurality.

Utilizing the vacuum pressure, the activated nozzles 238 extract the corresponding small objects from the removed sorting tray wells 86. That is, the provided vacuum draws, or sucks, the corresponding small objects into contact with the tip 262 of the activated nozzles 238 such that the corresponding small objects are free from the respective wells 86 and slightly above a top surface of the removed sorting tray 54. The regulators 37 are operable such that the vacuum pressure provided at the tip 262 of each nozzle 238 is modulated to exert sufficient force to extract the respective small object without damaging the respective small object. The extracted small objects are retained, or held, in contact with the respective nozzle tips 262 until the small objects are deposited into the selected receptacles 98, as described below.

In the embodiments wherein the removed sorting tray 54 is raised slightly to lightly contact the small objects with the nozzle tips 262 prior to activation of the selected nozzles 238, after the selected nozzles 238 are activated, the removed sorting tray 54 is lowered slightly such that the corresponding small objects are extracted from the removed sorting tray 54. That is, the removed sorting tray 54 is lowered slightly such that the corresponding small objects are free from the respective wells 86 and slightly able a top surface of the removed sorting tray 54.

Figure 5:
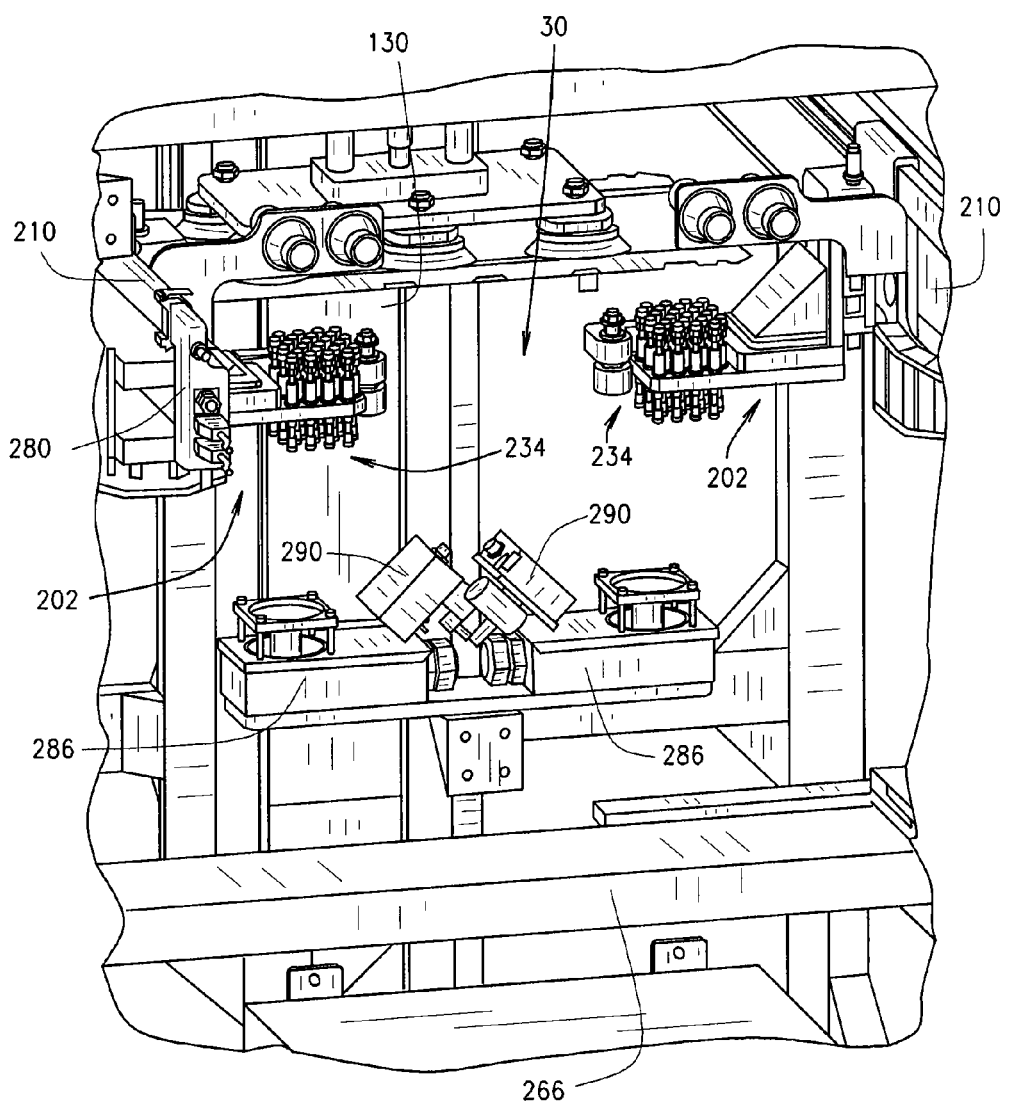
FIG. 5 is an isometric view of a portion of the automated small object sorting system shown in FIGS. 1A and 1B, illustrating a small object extraction verification assembly, in accordance with various embodiments of the present disclosure.

Referring additionally to FIG. 5, after the selected small objects have been extracted, the carriage transporter 210 is operated to transport the nozzle head 202, and the extracted small objects retained on the respective nozzle tips 262, to a small object extraction verification position between the extraction end 282 and the disposition end 280 of the carriage transporter 210. More specifically, the nozzle head 202 and extracted small objects are moved to a position directly above the small object verification assembly 30 that is located between the tray removal and positioning subsystem 18 and collection assembly positioning subsystem 22. The small object extraction verification assembly 30 is structured and operable to verify that the small object extraction subsystem 26 actually extracted each of the selected seeds from the seed tray.

The small object extraction verification assembly 30 can be any assembly, system, apparatus or device structured and operable, as controlled by the central control system 34, to verify that each activated vacuum nozzle 238 is, in fact, retaining the corresponding small object, thereby verifying that the selected small objects were actually extracted from the removed sorting tray 54. For example, the small object extraction verification assembly 30 can comprise any X-ray based, magnetic based, sonic based, light based or laser based imaging device, or any other device suitable for verifying that each activated vacuum nozzle 238 in fact retains a small object as the nozzle head 202 is transported from the tray removal and positioning subsystem 18 to the collection assembly positioning subsystem 22.

In various embodiments, the small object extraction verification assembly 30 includes one or more digital imaging devices 286 positioned to capture digital image data of the nozzle tips 262 of the nozzle array 234 as the nozzle head 202 is moved to the small object extraction verification position. Additionally, in various implementations, the small object extraction verification assembly 30 can include one or more light sources 290 positioned to project light on the nozzle tips 262 of the nozzle array 234 as the nozzle head 202 is moved to the small object extraction verification position.

The digital imaging device(s) 286 is/are communicatively linked to central control system 34. Hence, as the nozzle head 202 is moved to the small object extraction verification position, the digital imaging device(s) 286 capture digital image data of tips 262 of nozzles 238 and communicate the captured data to the central control system 34. The central controls system 34 then executes a verification algorithm, or a verification subroutine of the one or more system control algorithms, to analyze the received image data and determine whether a small object is in fact retained on the tips 262 of the selected activated nozzles 238. For example, utilizing known data identifying the location, i.e., Cartesian coordinates, of each nozzle tip 262 within nozzle array 234, the central control system 34 can analyze the captured image data to determine whether the location of each activated nozzle tip 262 includes data indicative of small object.

In various embodiments, if the image data at the location of any of the activated nozzles tips 262 indicates that a small object was 'missed, i.e., is not retained on the respective tip 262, the sorting system 10 will deposit the selected small objects that were extracted into the selected receptacles 98, as described below. Then, subsequently, the sorting system 10 will reattempt to extract the 'missed' small object. Reattempting to extract any 'missed' small object can be repeated any desirable number of times, e.g., twice. After the desired number of reattempts, the sorting system will cease attempting to extract the particular small object.

Referring now to FIG. 4A, once selected small objects have been extracted from the respective removed sorting tray 54 and the extraction verified, as described above, the central control system 34 executes the one or more system control algorithms to coordinated the operation of the small object extraction subsystem 26 and the collection assembly positioning subsystem 22 to selectively deposit the extracted small objects into one or more of the small object receptacles 98. More particularly, the central control system 34 utilizes receptacle data, input to the central control system 34 prior to initiation of the operation of the sorting system 10, the sorting tray information/data and the small object identification data acquired by the cart information device reader 110 and the tray information device reader 158 to deposit each of the extracted small objects into selected one or more receptacles 98. Specifically, the extracted small objects are deposited into the selected one or more receptacles 98 such that small objects having the same or similar attributes, e.g., characteristics and/or traits such as size, shape, color, composition, quality, weight, genetic traits, etc., are deposited into the same receptacle 98.

In various embodiments, each receptacle 98 includes a receptacle identification tag 294 containing the receptacle data. The receptacle data is used for identifying the respective receptacle 98 and cataloging the selected small objects deposited into the particular receptacle 98. More particularly, in various embodiments, the receptacle identification tags 294 are used to compile the receptacle data identifying the location, e.g., Cartesian coordinates, of each specific receptacle 98 within the multi-receptacle receiving fixture 270. Each location within the multi-receptacle receiving fixture 270 corresponds to the location, e.g., Cartesian coordinates, of a respective funnel 278 of the multi-funnel small object disposition fixture 274 such that when the multi-receptacle receiving fixture 270 is placed within the collection assembly 100, a dispensing end of each funnel 278 aligns with an open top end of a corresponding receptacle 98. Therefore, to deposit each extracted small object into a selected receptacle 98, the central control system 34 coordinates the operation of the small object extraction subsystem 26 and the collection assembly positioning subsystem 22 to deposit each extracted small object in the particular funnel 278 corresponding to the respective selected receptacle 98.

The multi-receptacle receiving fixture 270 can be any fixture structured to be removable retained within the collection assembly 100 and to provide or receive a plurality of receptacles 98 having any desired form or structure. The multi-receptacle receiving fixture 270 can be any fixture structured to retain a plurality of the collection receptacles 98. Additionally, the collection receptacles 98 can be any type of collection devices, apparatus or structures suitable for receiving extracted small objects. For example, the receptacles 98 can comprise envelopes, containers, tubes, cups, boxes or any other vessel suitable for receiving and retaining the extracted small objects.

For example, as shown in FIG. 4A, in various embodiments, the multi-receptacle receiving fixture 270 can be structured to retain a plurality of envelope receptacles 98. In such embodiments, the multi-receptacle receiving fixture 270 can include a base 298 having a plurality of slot 302 formed therein and a top plate 306 that provides a plurality of open tubes 310. Each open tube 310 is disposed within the top plate 306 such that each open tube is aligned with a bottom opening of a respective one of the funnels 278. The top plate 306 is connected to and spaced apart from the base 298 via a standoff 314. Each envelope receptacle 98 is placed in and retained by the multi-receptacle receiving fixture 270 by placing one of a respective one of the open tubes 310 inside a top opening of the envelope receptacle 98 and a bottom edge of each envelope receptacle 98 within a corresponding one of the base slots 302. The multi-receptacle receiving fixture 270 can then be placed within the collection assembly 100 such that the bottom opening of each funnel 278 aligns with a respective one of the open tubes 310. Accordingly, when a selected small object is released into one of the funnels 278, as described above, the small object will travel through the funnel and the open tube 310 such that the small object is deposited into the selected envelope receptacle 278.

Figure 4E:
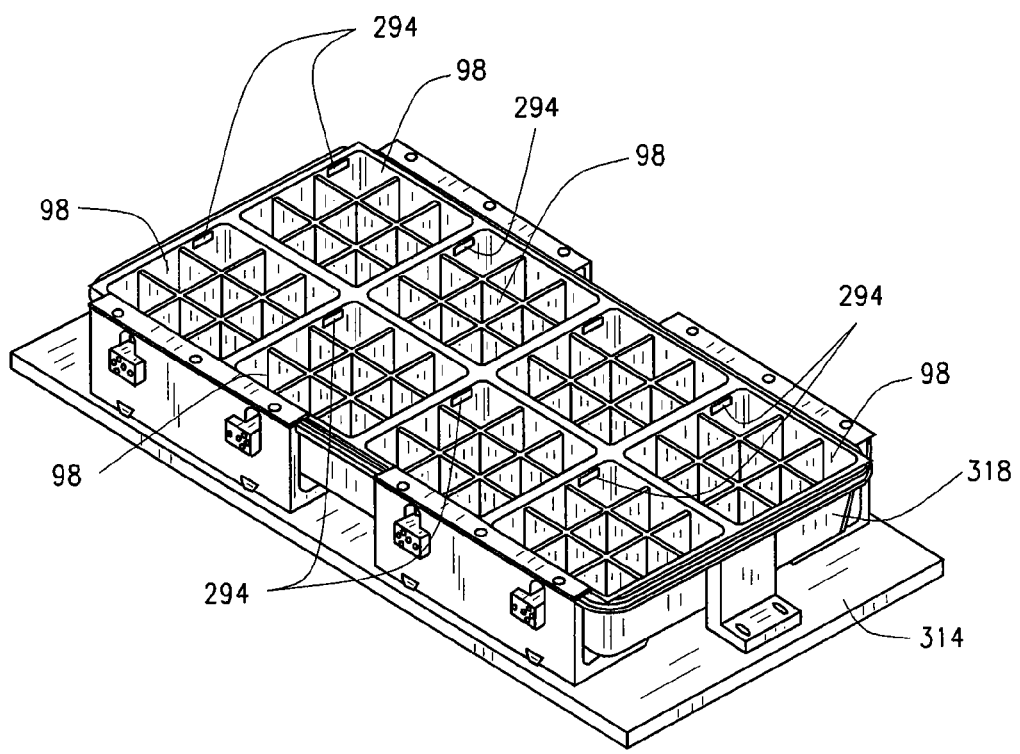
FIG. 4E is an isometric view of a multi-receptacle planter-ready tray structured to be retained within a collection assembly of the small object sorting shown in FIGS. 1A and 1B, in accordance with various other embodiments.

Referring to FIG. 4E, in various other embodiments, wherein the small objects to be sorted are agricultural products such as seeds, the multi-receptacle receiving fixture 270 can comprise an alignment platform 314 structured to be removably retained within the collection assembly 100 and to removable retain a multi-reservoir planter-ready tray 318. In such embodiments, the receptacles 98 can comprise a plurality of plant-ready cups or reservoirs 322 included in, formed in, or disposed in the multi-reservoir indexing tray 318. The plant-ready receptacles 98 can contain soil or other organic compound suitable and ready for planting seeding. Therefore, each extracted seed can be deposited into a respective funnel 98 whereby each seed is deposited, or planted, directly into a selected one of the plant-ready receptacles 98. In such embodiments, the multi-funnel small object disposition fixture 274 can be structured to provide a number of funnels 278 equal to the number of plant-ready receptacles 98 such that when the multi-receptacle receiving fixture 270 is placed within the collection assembly 100, the dispensing end of each funnel 278 will be directly above and in close proximity to a respective one of the plant-ready receptacles 98. Alternatively, each of the plurality of funnels 278 can be structured and operable to direct extracted seeds to two or more plant-ready receptacles 98.

In various embodiments, the 98 receptacles can include one or more discard cans 322 structured to receive selected extracted objects. Hence, some or all of the small objects within a respective sorting tray 54 can be sorted, whereby some of the small objects are sorted into the receptacles 98 for further use and others are sorted into the discard cans 322 to be disposed of.

Generally, prior to initiating operation of the sorting system 10, each receptacle tag 294 is read and each receptacle 294 is assigned a location within the multi-receptacle receiving fixture 270. The identification information for each receptacle 98 and the corresponding location of the receptacles 98 within the multi-receptacle receiving fixture 270 are stored in the central control system 34 as receptacle data used during execution of the one or more system control algorithms.

Each receptacle tags 294 can be any machine-readable identification device, label or tag suitable for containing or storing information and data, readable or retrievable by a receptacle tag reader (not shown) communicatively connected to the central control system 34, regarding or pertaining to each respective receptacle 98. For example, in various implementations, each receptacle tag 294 can comprise a two-dimensional matrix code or other machine-readable label, tag or device, such as a radio frequency identification (RFID) tag or a bar code label, from which the information/data can be received and interpreted via wireless communication such as optical signals, e.g., infrared signals, or magnetic fields. Similarly, the receptacle tag reader can be any device suitable for reading the receptacle tags 294 and communicating the receptacle data to the central control system 34. For example, in various implementations, the receptacle tag reader can comprise a device structured and operable to read a two-dimensional matrix code or other machine-readable label, tag or device, such as an RFID tag reader or a bar code label reader, operable to read the receptacle data stored in the respective receptacle tag 294 via wireless communication such as optical signals, e.g., infrared signals, or magnetic fields.

To deposit the extracted small objects into the receptacles 98 the central control system 34 controls and coordinates the operation of the small object extraction subsystem 26 and the collection assembly positioning subsystem 22 as follows. The carriage transporter 210 is operated to transport the nozzle head 202 carrying the extracted small objects to, or near, the disposition end 280 of the carriage transporter 210. At, or about, the same time, the collection assembly translation stage 266 is operated to position the funnel 278 corresponding to a selected one of the receptacles 98 at, or near, a location beneath the carriage transporter disposition end 280. The vacuum provided to the nozzles 238 retaining the small objects to be deposited into the selected receptacle 98 is then terminated such the small object(s) is/are released and fall(s) into the funnel 278, and subsequently into the selected receptacle 98.

More specifically, utilizing the known location of each funnel 278 within the collection assembly 100 and the receptacle data of each corresponding receptacle 98, the following movements of the small object extraction subsystem 26 and the collection assembly positioning subsystem 22 are coordinated to position a selected funnel 98 directly beneath and in close proximity to the nozzle tips 262 of the nozzle array 234 positioned at, or near, the carriage transporter extraction end 282. As used herein, the selected funnel 98 will be understood to indicate the funnel 98 corresponding to a selected one of the receptacles into which one or more of the extracted small objects are to be deposited.

The collection assembly 100 is moved along the collection assembly translation stage 266 in the $^+$X and/or $^-$X direction to position the selected funnel 98 in alignment, in the +Z and $^-$Z direction, with the nozzle head 202. The nozzle head 202 is then moved in the $^+$Z and/or $^-$Z direction, as needed, to locate nozzle tips 262 of the nozzle array 234 directly above and in close proximity to a top opening of the selected funnel 278. In various embodiments, the top opening of each funnel 278 can be sized to be slightly larger than the outer dimensions of the nozzle array 234 such that the nozzle tip 262 of each nozzle 238 in the array 234 is positioned directly above and in close proximity to the selected funnel 278 top opening.

Alternatively, the nozzle head 202 can be moved in the $^+$Z and/or $^-$Z direction to position the nozzle tips 262 of the nozzle array 234 in alignment, in the $^+$X and $^-$X direction, with the selected funnel 98. The collection assembly 100 is then moved along the collection assembly translation stage 266 in the $^+$X and/or $^-$X direction, as needed, to position the top opening of the selected funnel 278 directly beneath and in close proximity to the nozzle tips 262 of the nozzle array 234.

Once the nozzle array 234 is positioned directly above the selected funnel 278, the central control system 34 commands selected ones of the activated nozzles 238 to deactivate, i.e., terminate the vacuum pressure supplied to selected activated nozzles 238, thereby releasing selected small object(s) into the top end of the selected funnel 278. The selected funnel 278 guides the released small object(s) into the selected receptacle 98. As described above, the extracted small objects are deposited into the selected receptacles 98 such that small objects having the same or similar attributes, e.g., characteristics and/or traits such as size, shape, color, composition, quality, weight, genetic traits, etc., are deposited into the same receptacle 98.

If not all the extracted small objects are not deposited into the same receptacle 98, the nozzle head 202 and collection assembly 100 are moved, as described above to position the top opening of a subsequent selected funnel 278 directly beneath and in close proximity to the nozzle tips 262 of the nozzle array 234. Then other selected nozzles 238 are deactivated, i.e., the vacuum pressure is terminated, such that one or more subsequent selected small objects are released and deposited into a subsequent selected receptacle 98 based on the attributes of the respective small objects. This process is repeated until all the extracted small objects have been deposited into the respective selected receptacles 98. Subsequently, the nozzle head 202 is moved back to the tray removal and positioning subsystem 18 and, if the selection data stipulated that subsequent small objects are to be extracted from the removed sorting tray 54, the subsequent selected small objects are extracted and deposited into the selected receptacles 98 in the same manner as described above.

Once all the selected small objects have been extracted and deposited, as stipulated by the selection data, the tray locating assembly 118 and the tray locating assembly lift 122 are operated, as described above, to place the removed sorting tray 54 back into the sorting tray cart 38. Thereafter, if needed, based on the selection data, the sorting tray information/data and the small object identification data, a subsequent sorting tray 54 is removed from the cart 38 and the selected small objects are extracted and deposited into the selected receptacles 98, as described above. This process is repeated until the small object sorting system 10 has extracted and deposited, i.e., sorted, all the selected small objects as stipulated by the selection data.

Figure 6:
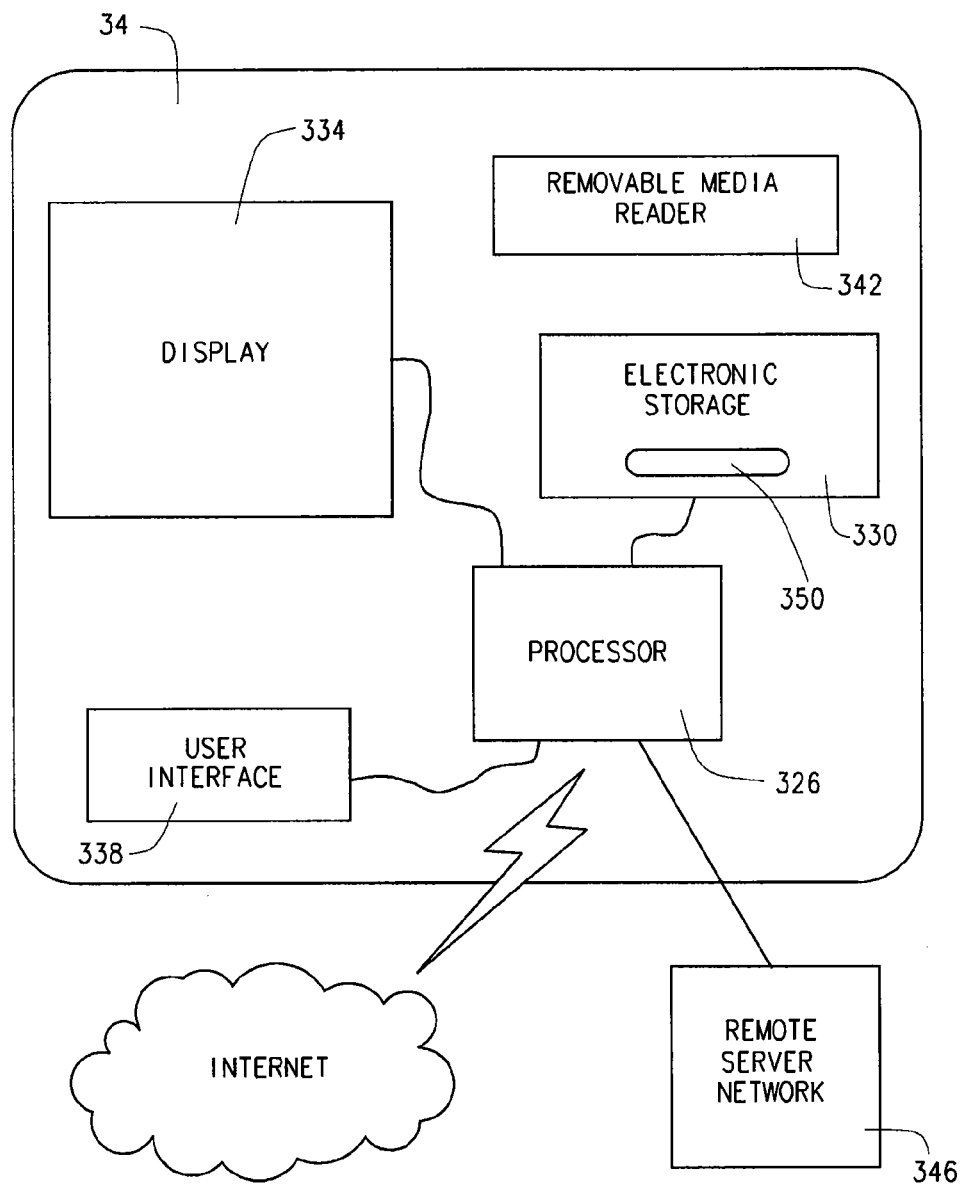
FIG. 6 is a block diagram of a central control system of the automated small object sorting system shown in FIGS. 1A and 1B, in accordance with various embodiments of the present disclosure.

Referring to FIG. 6, in various embodiments, the central control system 34 is a computer based system that generally includes at least one processor 326 suitable to execute all functions of central control system 34 to automatically, or robotically, control the operation of the sorting system 10, as described herein. The central control system 34 additionally includes at least one electronic storage device 340 that comprises a computer readable medium, such as a hard drive or any other electronic data storage device for storing such things as software packages or programs, algorithms and digital information, data, look-up tables, spreadsheets and databases. Furthermore, the central control system 34 includes a display 334 for displaying such things as information, data and/or graphical representations, and at least one user interface device 338, such as a keyboard, mouse, stylus, and/or an interactive touch-screen on the display 334. In various embodiments the central control system 34 can further include a removable media reader 342 for reading information and data from and/or writing information and data to removable electronic storage media such as floppy disks, compact disks, DVD disks, zip disks, flash drives or any other computer readable removable and portable electronic storage media. In various embodiments the removable media reader 342 can be an I/O port of the central control system 34 utilized to read external or peripheral memory devices such as flash drives or external hard drives.

In various embodiments, the central control system 34, i.e., the processor 154 can be communicatively connectable to a remote server network 346, e.g., a local area network (LAN), via a wired or wireless link. Accordingly, the central control system 34 can communicate with the remote server network 346 to upload and/or download data, information, algorithms, software programs, and/or receive operational commands. Additionally, in various embodiments, the central control system 34 can be structured and operable to access the Internet to upload and/or download data, information, algorithms, software programs, etc., to and from Internet sites and network servers.

In various embodiments, the central control system 34 can include one or more system control algorithms, or programs 350, stored on the storage device 330 and executed by processor 326. The one or more system control algorithms utilize the small object selection data and the receptacle data input to the central control system 34 prior to initiation of the operation of the sorting system 10, the sorting tray identification data acquired by the cart information device reader 110, the small object identification data acquired by the tray information device reader 158, and other inputs from various components and sensors of the various systems, subsystems, assemblies and subassemblies of the sorting system 10 to automatically operate the sorting system 10 as described herein.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. An automated small object sorting system comprising:
an object tray cart docking station structured and operable to receive and engage an object tray cart to dock the object tray cart within the object tray cart docking station;
an automated tray removal and positioning subsystem structured and operable to:
remove an object tray from the object tray cart, the object tray including a plurality of wells and a plurality of small objects stored within the wells;
selectively position the removed object tray such that selected ones of the small objects can be extracted from the removed object tray; and
replace the removed object tray into the object tray cart after the selected small objects have been extracted;
an automated collection assembly positioning subsystem structured and operable to selectively position a collection assembly such that the selected one or more small objects extracted from the removed object tray can be deposited into selected one or more of a plurality of object receptacles of the collection assembly;

an automated object extraction subsystem structured and operable to extract the selected one or more small objects from the object tray and deposit each extracted small object into the selected one or more object receptacles; and an object extraction verification assembly structured and operable to verify that the object extraction subsystem extracted each of the selected small objects from the object tray;

wherein the object tray cart docking station comprises a receiving assembly structured and operable to locate and retain the object tray cart in a specific position relative to the tray removal and positioning subsystem;

wherein the object tray cart docking station further comprises a cart information tag reader structured and operable to read a cart information tag affixed to the object tray cart, the cart information tag including information listing each of one or more object trays stored in the object tray cart.

2. The system of claim 1, wherein the object extraction verification assembly comprises one or more imaging devices structured and operable to capture image data of one or more nozzle heads of the object extraction subsystem and communicatively linked to a central control system operable to receive the image data and verify whether selected ones of a plurality of nozzles of the nozzle head have an extracted small objected retained on a tip of each selected nozzle.

3. The system of claim 1, wherein the object tray cart docking station further comprises a tray locking mechanism release actuator structured and operable to disengage a tray locking mechanism of the object tray cart such that one or more object trays stored within the object tray cart can be selectively removed by tray removal and positioning subsystem.

4. The system of claim 1, wherein the automated tray removal and positioning subsystem comprises:
   a tray locating assembly structured and operable to remove selected object trays from the docked object tray cart, selectively position the removed object tray such that selected ones of the small objects can be extracted from the removed object tray, and reinsert the removed object trays into the docked object tray cart after the selected small objects have been extracted; and
   a tray locating assembly lift structured and operable to selectively raise and/or lower the tray locating assembly.

5. The system of claim 4, wherein the tray removal and positioning subsystem further comprises a tray information tag reader structured and operable to read a tray information tag affixed to each object tray stored in the cart, each tray information tag including:
   information identifying each respective object tray;
   identifying information of each small object stored in each respective object tray; and
   a location, within the respective object tray, of the well in which each respective small object is stored.

6. The system of claim 1, wherein the object extraction subsystem comprises at least one object transfer assemblies extending between the tray removal and positioning subsystem and the collection assembly positioning subsystem, each object transfer assembly structured and operable to extract the selected one or more small objects from the object tray removed by the tray removal and positioning subsystem and deposit each extracted small object into the selected one or more object receptacles of the collection assembly.

7. The system of claim 6, wherein each object transfer assembly comprises a nozzle head removably mounted to a nozzle head carriage mounted to a carriage transporter structured and operable to move the nozzle head carriage and nozzle head between the tray removal and positioning subsystem and the collection assembly positioning subsystem.

8. The system of claim 7, wherein at least one of the nozzle head carriage and the nozzle head comprise one or more magnets operable to magnetically mount the nozzle head to the nozzle head carriage.

9. The system of claim 7, wherein each nozzle head comprises a nozzle array including a plurality of nozzles connectable to a vacuum source operable to selectively provide a vacuum at a tip of each nozzle used to extract the selected one or more small objects from the object tray and retain the one or more extracted small objects when the nozzle head is moved from the tray removal and positioning subsystem to the collection assembly positioning subsystem to transport the one or more extracted small objects from the object tray to the collection assembly.

10. The system of claim 7, wherein each carriage transporter comprises a linear motor structured and operable to produce a controllable linear force to controllably move the nozzle head carriage and nozzle head between the tray removal and positioning subsystem and the collection assembly positioning subsystem.

11. The system of claim 9, wherein the system further comprises a center control system operable to control operation of the tray removal and positioning subsystem and the object extraction subsystem, and to utilize electronically stored data, to position the respective nozzle head and the object tray relative to each other and to stipulate specific ones of the nozzles to which the vacuum is provided such that the selected one or more small objects are extracted from the object tray, wherein the data comprises data identifying particular traits or characteristics of each small object in the object tray and the location of each respective small object within the object tray such that the small objects are extracted based on the traits or characteristics of each respective small object.

12. The system of claim 11, wherein the collection assembly positioning subsystem comprises a single axis stage structured and operable to selectively position the collection assembly along a longitudinal axis of the stage.

13. The system of claim 12, wherein the collection assembly comprises:
   a multi-receptacle object receiving fixture that includes the one or more object receptacles; and
   a multi-funnel object disposition fixture that includes a plurality of funnels structured to receive the one or more small objects extracted from the object tray and deposit the one or more small objects into the selected one or more object receptacles.

14. The system of claim 12, wherein the single axis stage comprises a linear motor structured and operable to produce a controllable linear force to selectively position the collection assembly along a longitudinal axis of the linear motor such that the selected ones of the funnels are positioned beneath a selected one of the nozzle heads, whereby the one or more extracted small objects can be deposited into the selected one or more object receptacles.

15. The system of claim 12, wherein the central control system is operable to control operation of the object extraction subsystem and the collection assembly positioning subsystem, and to utilize the electronically stored data to position the respective nozzle head and the multi-funnel object disposition fixture relative to each other and to stipulate specific ones of the nozzles for which the vacuum is terminated such that the selected one or more small objects are released from the respective nozzle into a selected one of the funnels such that each small object is deposited into a corresponding selected object receptacle.

16. The system of claim 13, wherein the one or more object receptacles comprises a plurality of containers and the multi-receptacle object receiving fixture is structured to retain and position the containers such that an open end of each container is aligned with a dispensing end of a corresponding one of the funnels.

17. The system of claim 13, wherein the one or more object receptacles comprises a plurality of plant-ready cups and the multi-receptacle object receiving fixture includes an alignment platform structured to retain and position the plant-ready cups such that an open end of each plant-ready cup is aligned with a dispensing end of a corresponding one of the funnels.

18. The system of claim 1, wherein the system further comprises the object tray cart.

19. The system claim 1, wherein the small objects comprise seeds, the object tray comprises a seed tray, and the object receptacles comprise seed receptacles.

* * * * *